United States Patent
Amiri et al.

(10) Patent No.: US 11,979,245 B2
(45) Date of Patent: *May 7, 2024

(54) AUGMENTING AUDIENCE MEMBER EMOTES IN LARGE-SCALE ELECTRONIC PRESENTATION

(71) Applicant: Airbnb, Inc., San Francisco, CA (US)

(72) Inventors: Avand Amiri, Mariposa, CA (US); Stepan Parunashvili, New York City, NY (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,894

(22) Filed: Mar. 24, 2023

(65) Prior Publication Data

US 2023/0231730 A1     Jul. 20, 2023

Related U.S. Application Data

(63) Continuation of application No. 17/352,739, filed on Jun. 21, 2021.

(Continued)

(51) Int. Cl.
| | |
|---|---|
| *G06V 40/20* | (2022.01) |
| *G06F 18/214* | (2023.01) |
| *G06F 18/25* | (2023.01) |
| *G06Q 10/02* | (2012.01) |
| *G06T 13/40* | (2011.01) |

(Continued)

(52) U.S. Cl.
CPC ........ *H04L 12/1818* (2013.01); *G06F 18/214* (2023.01); *G06F 18/253* (2023.01); *G06Q 10/02* (2013.01); *G06T 13/40* (2013.01); *G06V 20/40* (2022.01); *G06V 40/176* (2022.01); *G06V 40/20* (2022.01); *H04L 12/1822* (2013.01);

(Continued)

(58) Field of Classification Search
CPC .... G06V 40/176; G06V 40/20; H04L 65/403; H04N 7/157
See application file for complete search history.

(56) References Cited

U.S. PATENT DOCUMENTS

| | | |
|---|---|---|
| D502,184 S | 2/2005 | Glezer et al. |
| D575,297 S | 8/2008 | Glezer et al. |

(Continued)

OTHER PUBLICATIONS

"U.S. Appl. No. 17/352,688, Non Final Office Action dated Dec. 1, 2022", 14 pgs.

(Continued)

*Primary Examiner* — Amal S Zenati
(74) *Attorney, Agent, or Firm* — Schwegman Lundberg & Woessner, P.A.

(57) ABSTRACT

A presentation service generates an audience interface for an electronic presentation. The audience interface may simulate an in-person presentation, including features such as a central presenter and seat locations for audience members. The audience members may select emotes which may be displayed in the audience interface. The emotes may indicate the audience members' opinion of the content being presented. The presentation service may enable chats between multiple audience members, grouping of audience members private rooms, and other virtual simulations of functions corresponding to in-person presentations.

20 Claims, 14 Drawing Sheets

Related U.S. Application Data

(60) Provisional application No. 63/041,497, filed on Jun. 19, 2020.

(51) Int. Cl.
*G06V 20/40* (2022.01)
*G06V 40/16* (2022.01)
*H04L 12/18* (2006.01)
*H04L 51/046* (2022.01)
*H04L 51/08* (2022.01)
*H04L 65/403* (2022.01)
*H04N 7/15* (2006.01)

(52) U.S. Cl.
CPC ............ *H04L 51/046* (2013.01); *H04L 51/08* (2013.01); *H04L 65/403* (2013.01); *H04N 7/157* (2013.01)

(56) References Cited

U.S. PATENT DOCUMENTS

| | | | |
|---|---|---|---|
| 7,683,940 | B2 | 3/2010 | Fleming |
| D636,780 | S | 4/2011 | Musleh |
| D650,392 | S | 12/2011 | Glezer et al. |
| D664,560 | S | 7/2012 | Gilmore et al. |
| D669,086 | S | 10/2012 | Boyer et al. |
| D681,049 | S | 4/2013 | Freiberger |
| D682,849 | S | 5/2013 | Aoshima |
| D684,162 | S | 6/2013 | Aoshima |
| D685,810 | S | 7/2013 | Way, Sr. et al. |
| D687,839 | S | 8/2013 | Narayanamurthy |
| D688,687 | S | 8/2013 | Smith et al. |
| D690,725 | S | 10/2013 | Song et al. |
| D696,277 | S | 12/2013 | Lee et al. |
| 9,158,747 | B2 | 10/2015 | Lee |
| D742,902 | S | 11/2015 | Yoneda et al. |
| D757,062 | S | 5/2016 | Peng et al. |
| D768,160 | S | 10/2016 | Mcrae et al. |
| 9,794,514 | B1 | 10/2017 | Yoakum |
| D803,229 | S | 11/2017 | Reyes et al. |
| 9,843,768 | B1 | 12/2017 | Negi et al. |
| D879,800 | S | 3/2020 | King et al. |
| 10,755,463 | B1* | 8/2020 | Albuz ..................... G10L 13/00 |
| 11,228,625 | B1 | 1/2022 | Libin |
| 11,321,890 | B2 | 5/2022 | Paradiso et al. |
| 11,398,920 | B2 | 7/2022 | Amiri et al. |
| 11,552,812 | B2 | 1/2023 | Amiri et al. |
| 11,646,905 | B2 | 5/2023 | Amiri et al. |
| 2005/0069852 | A1 | 3/2005 | Janakiraman et al. |
| 2010/0306671 | A1 | 12/2010 | Mattingly et al. |
| 2011/0145757 | A1 | 6/2011 | Janwari |
| 2011/0225519 | A1 | 9/2011 | Goldman et al. |
| 2011/0270923 | A1 | 11/2011 | Jones et al. |
| 2012/0182384 | A1 | 7/2012 | Anderson et al. |
| 2012/0204203 | A1 | 8/2012 | Vandenbulcke et al. |
| 2013/0073985 | A1 | 3/2013 | Hamlin et al. |
| 2014/0085101 | A1 | 3/2014 | Rahman et al. |
| 2014/0267577 | A1 | 9/2014 | Weber et al. |
| 2015/0106134 | A1 | 4/2015 | Gandham et al. |
| 2016/0042281 | A1 | 2/2016 | Cunico et al. |
| 2016/0042648 | A1* | 2/2016 | Kothuri ................ G06V 40/166 434/236 |
| 2017/0171267 | A1 | 6/2017 | Cornell |
| 2017/0315699 | A1 | 11/2017 | Markus et al. |
| 2018/0006837 | A1 | 1/2018 | Cartwright et al. |
| 2018/0295158 | A1 | 10/2018 | Faulkner |
| 2019/0038981 | A1 | 2/2019 | Dowell et al. |
| 2019/0102941 | A1 | 4/2019 | Khan et al. |
| 2019/0232157 | A1 | 8/2019 | Hickman et al. |
| 2020/0007934 | A1 | 1/2020 | Ortiz et al. |
| 2021/0027511 | A1 | 1/2021 | Shang et al. |
| 2021/0049497 | A1 | 2/2021 | Jia et al. |
| 2021/0067476 | A1 | 3/2021 | Baker et al. |
| 2021/0398032 | A1 | 12/2021 | Amiri et al. |
| 2021/0399910 | A1 | 12/2021 | Amiri et al. |
| 2021/0400236 | A1 | 12/2021 | Amiri et al. |
| 2021/0400237 | A1 | 12/2021 | Amiri et al. |
| 2022/0086395 | A1* | 3/2022 | Petajan ................. G10L 19/167 |
| 2022/0138470 | A1 | 5/2022 | Seleskerov et al. |
| 2022/0383338 | A1 | 12/2022 | Sunder et al. |
| 2023/0105215 | A1 | 4/2023 | Amiri et al. |

OTHER PUBLICATIONS

"U.S. Appl. No. 17/352,688, Response filed Feb. 21, 2023 to Non Final Office Action dated Dec. 1, 2022", 10 pgs.
"U.S. Appl. No. 17/352,739, Corrected Notice of Allowability dated Jan. 27, 2023", 2 pgs.
"U.S. Appl. No. 17/352,739, Non Final Office Action dated Jun. 8, 2022", 9 pgs.
"U.S. Appl. No. 17/352,739, Notice of Allowance dated Dec. 27, 2022", 6 pgs.
"U.S. Appl. No. 17/352,739, Response filed Nov. 7, 2022 to Non Final Office Action dated Jun. 8, 2022", 12 pgs.
"U.S. Appl. No. 17/352,784, Non Final Office Action dated Oct. 12, 2021", 20 pgs.
"U.S. Appl. No. 17/352,784, Notice of Allowance dated Apr. 5, 2022", 10 pgs.
"U.S. Appl. No. 17/352,784, Response filed Mar. 2, 2022 to Non Final Office Action dated Oct. 21, 2021", 13 pgs.
"U.S. Appl. No. 17/352,828, Corrected Notice of Allowability dated Dec. 13, 2022", 2 pgs.
"U.S. Appl. No. 17/352,828, Non Final Office Action dated Apr. 14, 2022", 16 pgs.
"U.S. Appl. No. 17/352,828, Notice of Allowance dated Sep. 8, 2022", 5 pgs.
"U.S. Appl. No. 17/352,828, Response filed Aug. 8, 2022 to Non Final Office Action dated Apr. 14, 2022", 11 pgs.
"U.S. Appl. No. 29/738,856, Non Final Office Action dated May 23, 2022", 8 pgs.
"U.S. Appl. No. 29/738,857, Non Final Office Action dated May 23, 2022", 7 pgs.
Amiri, A, et al., "Awedience Tweet", Twitter, [Online] [Retrieved on Sep. 16, 2020], Retrieved from the Internet <URL: https//twitter.com/avand/status/1259992001686061056?s=20>, (May 11, 2020).
Ku, V, "Awedience Post", Instagram, [Online] [Retrieved on Sep. 16, 2020], Retrieved from the Internet <URL: https://<<www.instagram.com/p/B_6GIYIpacY/?igshid=;2i2tdfr6vrer>, (May 7, 2020), 1 pg.
Yasutake, A, et al., "Awedience Post", LinkedIn, (May 2020), 1 pg.
"U.S. Appl. No. 17/352,739, Corrected Notice of Allowability dated Apr. 6, 2023", 2 pgs.
"U.S. Appl. No. 17/352,688, Final Office Action dated Apr. 10, 2023", 15 pgs.
"U.S. Appl. No. 17/352,688, Response filed Jun. 28, 2023 to Final Office Action dated Apr. 10, 2023", 10 pgs.
"U.S. Appl. No. 17/352,688, Advisory Action dated Jul. 11, 2023", 3 pgs.
"U.S. Appl. No. 17/352,688, Corrected Notice of Allowability dated Oct. 2, 2023", 2 pgs.
"U.S. Appl. No. 17/352,688, Notice of Allowance dated Sep. 18, 2023", 13 pgs.
"U.S. Appl. No. 18/076,019, Non Final Office Action dated Aug. 18, 2023", 11 pgs.
"U.S. Appl. No. 18/076,019, Notice of Allowance dated Dec. 7, 2023", 9 pgs.
"U.S. Appl. No. 18/076,019, Response filed Nov. 9, 2023 to Non Final Office Action dated Aug. 18, 2023", 6 pgs.
U.S. Appl. No. 17/352,739, filed Jun. 21, 2021, Aggregating Audience Member Emotes in Large-Scale Electronic Presentation.
U.S. Appl. No. 17/352,828 U.S. Pat. No. 11,552,812, filed Jun. 21, 2021, Outputting Emotes Based on Audience Member Expressions in Large-Scale Electronic Presentation.
U.S. Appl. No. 18/076,019, filed Dec. 6, 2022, Outputting Emotes Based on Audience Member Expressions in Large-Scale Electronic Presentation.

(56) References Cited

OTHER PUBLICATIONS

U.S. Appl. No. 17/352,688, filed Jun. 21, 2021, Incorporating Individual Audience Member Participation and Feedback in Large-Scale Electronic Presentation.
U.S. Appl. No. 17/352,784 U.S. Pat. No. 11,398, 920, filed Jun. 21, 2021, Outputting Emotes Based on Audience Segments in Large-Scale Electronic Presentation.
"U.S. Appl. No. 17/352,688, Corrected Notice of Allowability mailed Jan. 19, 2024", 2 pgs.

* cited by examiner

AUGMENTING AUDIENCE MEMBER EMOTES IN LARGE-SCALE ELECTRONIC PRESENTATION

CROSS-REFERENCE TO RELATED APPLICATIONS

This application is a continuation of U.S. patent application Ser. No. 17/352,739, filed Jun. 21, 2021, which claims the benefit of U.S. Provisional Application No. 63/041,497, filed on Jun. 19, 2020, which are incorporated by reference in their entirety.

TECHNICAL FIELD

The disclosure generally relates to the field of electronic conferencing, and more particularly to incorporating audience feedback during a large-scale electronic presentation.

BACKGROUND

Video conferencing systems today are structured for face to face type interactions. This experience exists even in the one to many broadcasts via conventional video conferencing systems. Present online software configurations lack capability to replicate the experience of being in physical environments such as an auditorium watching a presentation on stage. For example, audience members may be intentionally muted by the video conference presenter. Further, these services do not attribute emotion to a specific audience member.

Moreover, in conventional video conferencing systems as audience members enter into the video conference they are simply "added in" as a video thumbnail linearly or "at the end" of the others in the stream are placed. In addition, if the video conference system permits audio of the attendee to be tracked, the audience member thumbnail may be "moved" to a predefined portion of the video conference view box of attendees, e.g., moved to front of linear screen. That is, in conventional video conferencing systems there is no concept of "sitting together" during a presentation. Hence, being an audience member in conventional online video conferencing systems is unlike being an audience member in physical environments.

In addition, in many video conferencing systems with a large number of participants, the video and user information often is suppressed or limited to others that are attending and/or presenting. Hence, audience members and/or presenters are unable to see or learn more about attendees. Hence, conventional video conferencing systems are not conducive to easily understand who is in the audience, how they feel, and naturally engage with audience members. Moreover, this limitation often is more pronounced in physical audience configurations as presenters and/or audience members cannot just glance at unknown audience members and learn more about them. Further scalability and efficiency challenges of conventional video conferencing systems are solved by the disclosure herein.

SUMMARY

A presentation service generates an audience interface for an electronic presentation. The audience interface may simulate an in-person presentation, including features such as a central presenter and seat locations for audience members. The audience members may select emotes which may be displayed in the audience interface. The emotes may indicate the audience members' opinion of the content being presented. The presentation service may enable chats between multiple audience members, grouping of audience members private rooms, and other virtual simulations of functions corresponding to in-person presentations.

In some embodiments, a presentation service may detect emotes from a plurality of audience devices. The presentation service may output the emotes within an auditorium interface for display to the plurality of audience devices, wherein each of the emotes are output in association with a seat corresponding to users who selected the emotes. For a given output emote, the presentation service may render an animation that moves the given output emote across one or more seats of other users who did not select the given output emote. The presentation service may output the rendered animation for display to the plurality of audience devices.

In some embodiments, a presentation service may detect emotes of a plurality of emote types from a plurality of audience devices participating in an electronic presentation within a time interval. The presentation service may determine a respective amount of emotes of each respective emote type detected within the time interval. The presentation service may determine whether the respective amount of emotes exceeds a threshold. Responsive to determining that the respective amount of emotes exceeds the threshold, the presentation service may aggregate the emotes into an aggregated emote. The presentation service may output the aggregated emote for display to the plurality of audience devices.

In some embodiments, a presentation service may output an auditorium interface comprising a central interface and a plurality of seats, the central interface outputting an electronic presentation. The presentation service may assign audience members to seats of the plurality of seats based on requests from the audience members. The presentation service may detect emotes from the audience members during the electronic presentation. Responsive to detecting a threshold amount of emotes from the audience members within an interval of time, the presentation service may segment the plurality of seats into segments based on an amount of emotes emanating from each segment. The presentation service may generate a plurality of emote aggregations, each emote aggregation corresponding to a given segment, each emote aggregation having a magnitude that corresponds to the amount of emotes emanating from its respective segment. The presentation service may output each emote aggregation in association with its respective segment for display to the audience members.

In some embodiments, a presentation service may receive a stream of images of an audience member that is attending an electronic presentation, the stream of images captured during the electronic presentation. The presentation service may determine, based on a subset of frames of the stream of images, an expression of the audience member. The presentation service may determine whether the expression corresponds to a predefined emote. Responsive to determining that the expression corresponds to the predefined emote, the presentation service may output the predefined emote for display to a plurality of audience members that are attending the electronic presentation.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Electronic Presentation System Environment

Figure 1:
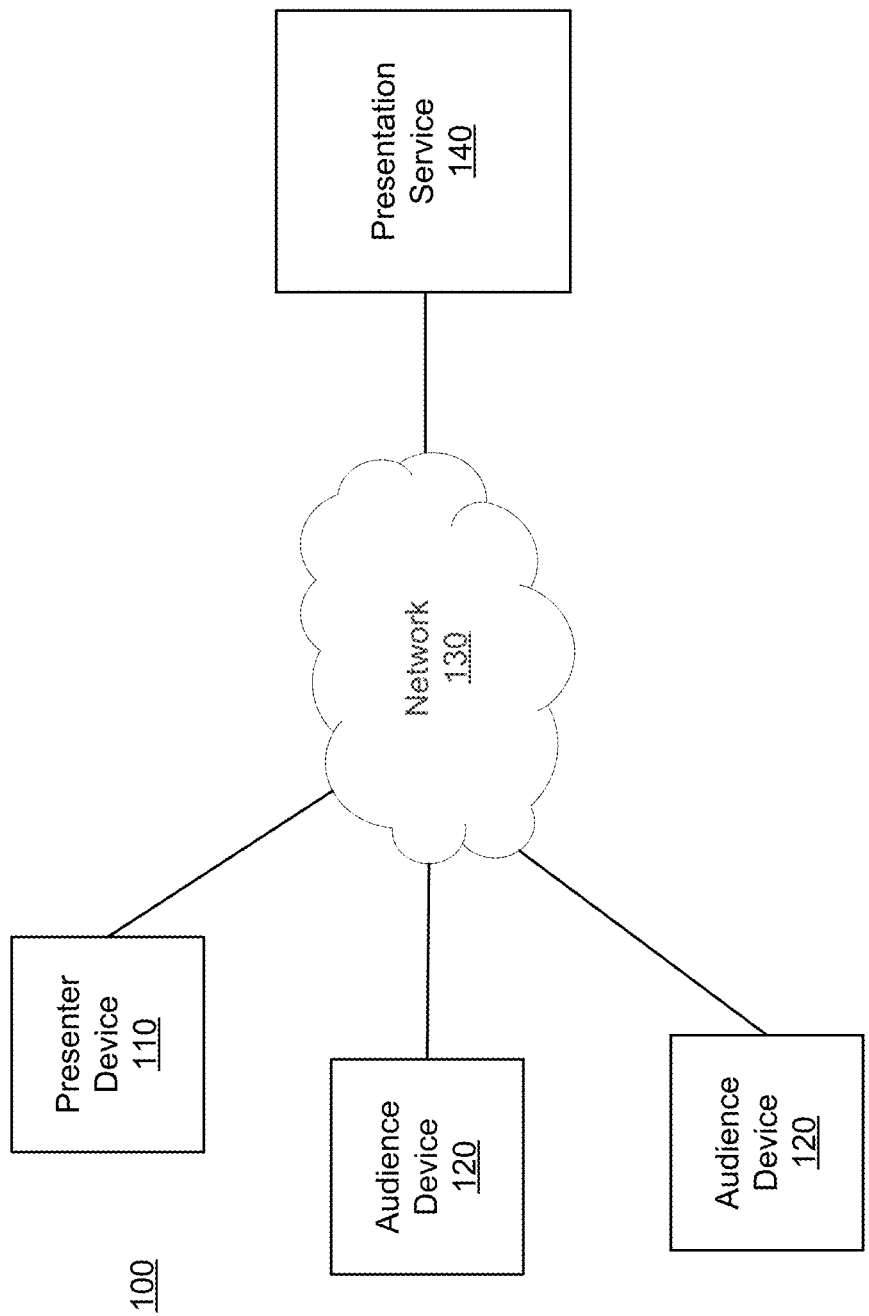
FIG. 1 illustrates one embodiment of system environment showing a presentation service, a presenter device, and audience devices.

FIG. 1 illustrates one example embodiment of system environment 100. The system environment may include a presentation service 140, at least one presenter device 110, and at least one audience device 120. In the illustrated example of environment 100, the presenter device 110, audience device(s) 120, and presentation service 140 are communicatively coupled through network 130.

Presenter device 110 may be one or more devices operated by a presenter of an electronic presentation that may be available for viewing by others (e.g., audience devices 120) connected to network 130. The term presenter, as used herein, may refer to a person who has control over a central interface (e.g., stage) of the electronic presentation. The term electronic presentation, as used herein, may refer to an electronic meeting including one or more presenters and one or more audience members, where a central interface is manipulated by the presenter. Further details of the electronic presentation and central interface are described below with respect to FIGS. 2-11. As illustrated one presenter device 110 is depicted in environment 100, but as noted more than one presenter device 110 may take part in the electronic presentation. In an embodiment, multiple presenter devices 110 may have control over the electronic presentation. In an embodiment, presenter device 110 may pass control to audience device 120, thus converting audience device 120 into a presenter device 110. In such a scenario, presenter device 110 may retain control as well, or may relinquish control to the converted audience device 120.

Audience device(s) 120 may be used by audience members to attend the electronic presentation. Audience device 120 displays the central interface of the presentation, thus enabling audience members to view what presenter device 110 is presenting. Audience device 120 may also be used for various additional functionality. Audience devices 120 may receive commands from audience members to output emotes (e.g., emojis and text). These emotes may be visible to some or all audience members. Thus, audience members are enabled to output information visible to other audience members and/or the presenter, even without having control of the central interface. Audience device 120 offers a myriad of additional functionality that will be disclosed in further detail below with respect to FIGS. 2-11.

Presenter device 110 and audience device 120 may be client devices. Client devices may be any computing device suitable for performing the functionality disclosed herein. Exemplary client devices include personal computers, laptops, tablets, smartphones, and so on. Client devices communicate through network 130 to access presentation service 140. Network 130 may be any network capable of data transmission, such as the Internet. Presentation service 140 may be configured to facilitate an electronic presentation among presenter device 110 and audience devices 120. Presentation service 140 may be implemented using one or more servers. Additional details on how presentation service 140 operates are described in further detail below with respect to FIG. 2.

Example Presentation Service

Figure 2:
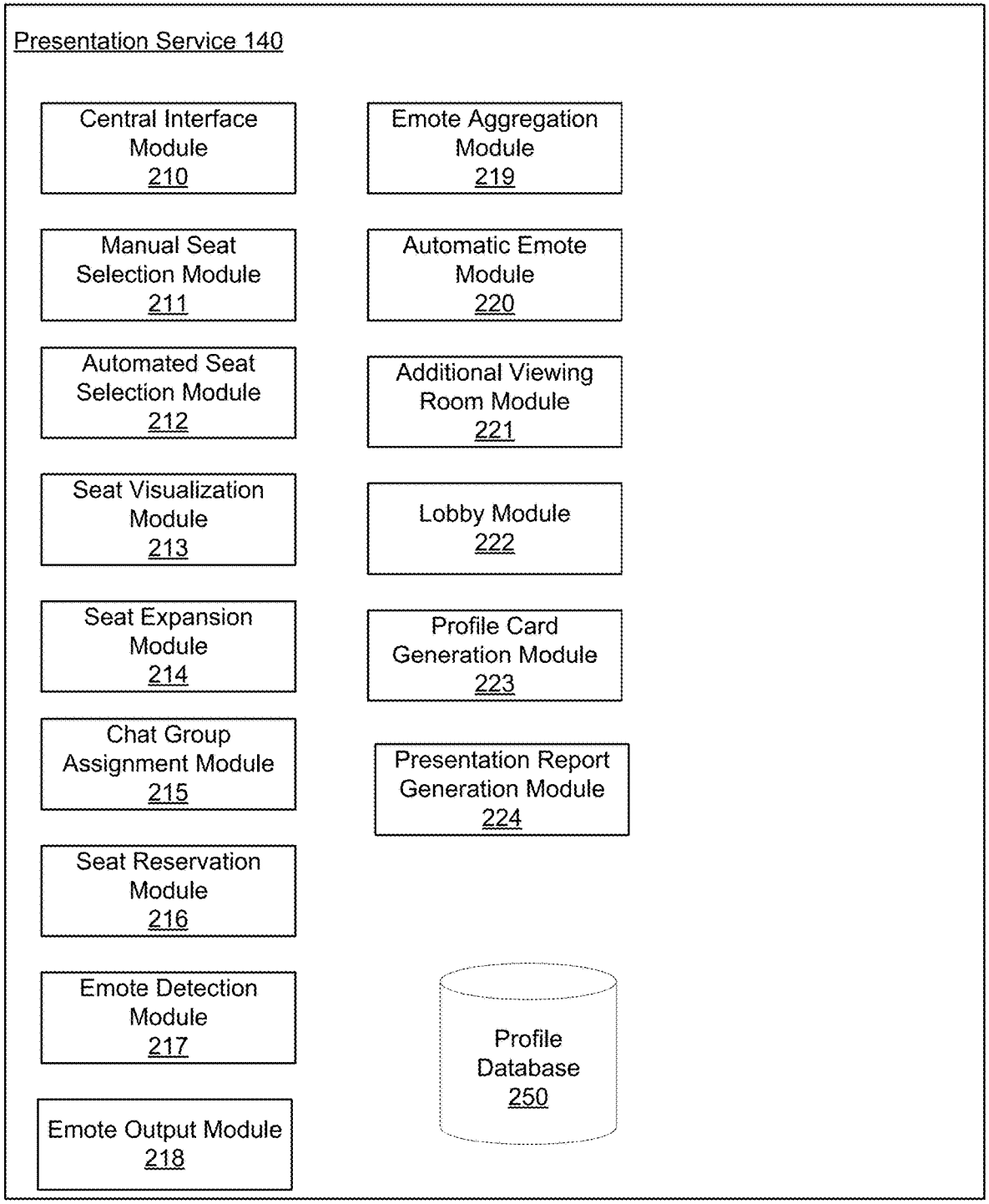
FIG. 2 illustrates one embodiment of exemplary modules and databases of the presentation service.

FIG. 2 illustrates one embodiment of exemplary modules and databases of the presentation service 140. Presentation service 140 may include central interface module 210, manual seat selection module 211, automated seat selection module 212, seat visualization module 213, seat expansion module 214, chat group assignment module 215, seat reservation module 216, emote detection module 217, emote output module 218, emote aggregation module 219, automatic emote module 220, additional viewing room module 221, lobby module 222, profile card generation module 223, presentation report generation module 224, and profile database 250. The modules and databases depicted with respect to FIG. 2 are merely exemplary; fewer or more modules and databases may be used to achieve the functionality described herein. Moreover, some or all modules or databases of presentation service 140 may be instantiated local to presenter device 110 and/or audience device 120 (e.g., within an application installed to the client devices that supports electronic presentations). Further, modules may be embodied as program code (e.g., software comprised of instructions stored on non-transitory computer readable storage medium and executable by at least one processor) and/or hardware (e.g., application specific integrated circuit (ASIC) chips or field programmable gate arrays (FPGA) with firmware. The modules correspond to at least having the functionality described when executed/operated. In addition, the modules may be executable by some or all the components of a machine, e.g., some or all of the components of a computer system as described with FIG. 6.

Figure 3:
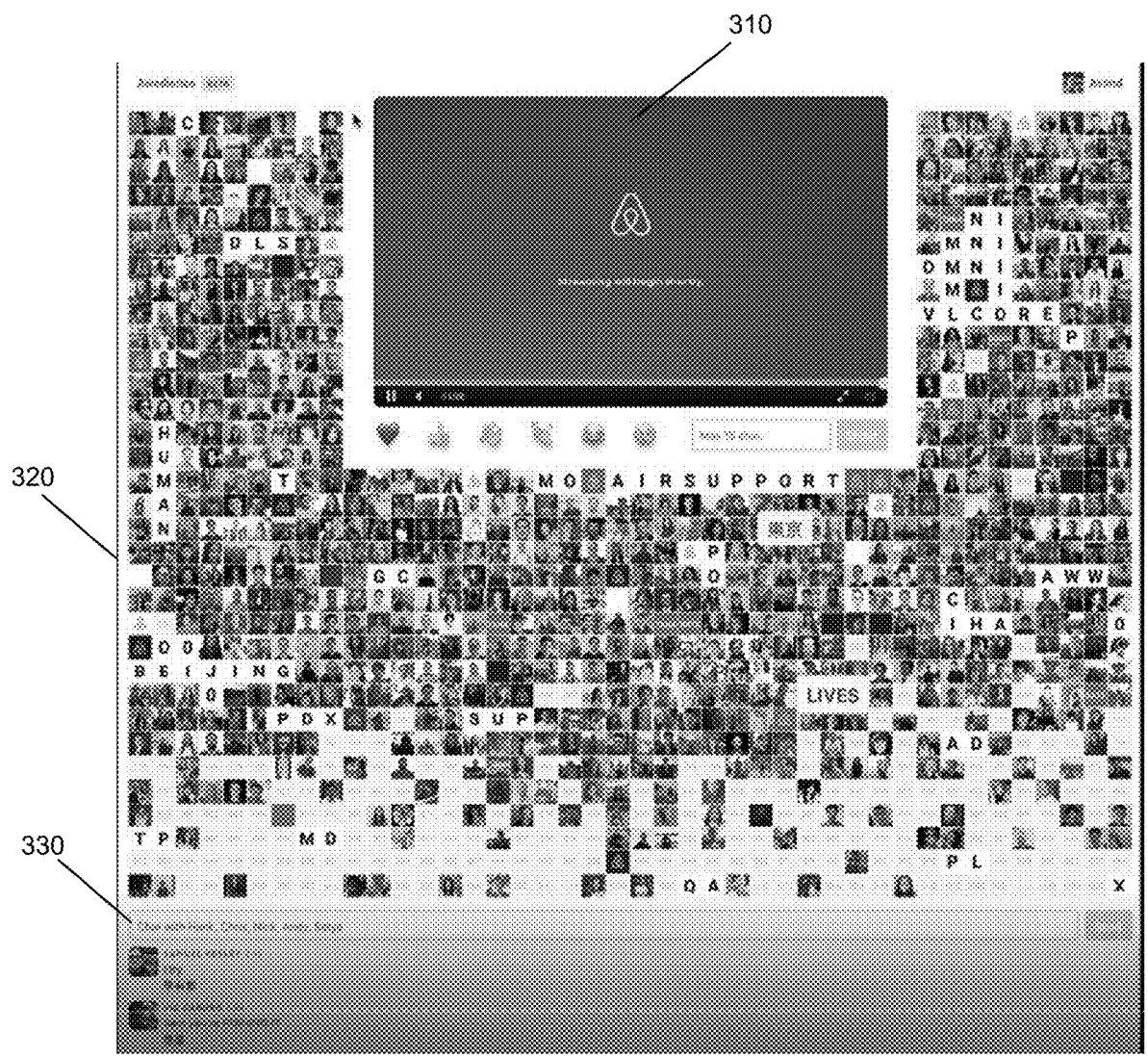
FIG. 3 depicts an exemplary user interface operated by the presentation service.

Central interface module 210 may enable and/or generate a graphical user interface (or user interface) to be displayed that includes a center interface (sometimes interchangeably referred to herein as a "stage") for output as an electronic presentation, e.g., to a screen of presenter device 110 and to screens of audience members 120. To illustrate, reference is made to FIG. 3 to introduce a user interface for an electronic presentation that is enabled for display (or render) on a screen associated with the presenter device 110 and/or screen associated with an audience device 120. FIG. 3 depicts an exemplary user interface operated by the presentation service 140. The rendered auditorium 300 includes central interface 310, seats 320, and chat bar 330. As illustrated, auditorium 300 is formatted in an exemplary manner to recreate a look and feel of an auditorium or stadium with a central stage, though it may be formatted in any manner consistent with this disclosure. For example, a typical physical auditorium set up is a keynote address where a presenter is on stage and looking out at the audience. From this perch in the physical auditorium, a presenter may receive feedback from the audience in the form of audio cues such as applause and/or visual cues such as facial and body expression. These audience experiences are lacking in conventional video conferencing systems.

The disclosed system provides an electronic analog to the physical environment through the experience configured through the presentation service 140 and the user interface that includes auditorium 300. For example, the user interface of auditorium 300 includes a central interface 310 that may replicate placement of a physical stage along a top edge of a rendered user interface with "seating" corresponding to audience members around it in a 'U' shape arrangement in this example. This may correspond to a presenter presented through the central interface 310 looking out at the audience. The seating, as is further described herein, is where those participating as audience members in the presentation may select to "sit" amongst the audience and will be viewed consistently in that location on the user interface by the presenter and other audience attendees that are "sitting" in the audience from where they selected to locate in the user interface. In alternate configurations, the central interface 310 may be along a side or bottom with seating around those locations. In yet other embodiments, the central interface may run the full length of a user interface edge with seating in front. In still other user interface configurations, the central interface 310 may be in a center with audience seating surrounding it.

Additionally, in a physical audience environment, groups of people often congregate together so that they can interact with each other (e.g., whispering) during the presentation. For example, they may whisper conversations (or verbally chat) with people immediately around them, e.g., with the person or the left, right, front, or back of them. Moreover, in certain physical environments groups of people may wish to sit together as representative of a grouping or pack, for example, a product development team or a department in a company that may be attending a keynote by a CEO of that company on a big product launch date. The functionality enabled through the configuration of presentation service 140 and the user interface of auditorium 300 invokes and improves on this manner of interactivity in manners that cannot be achieved by conventional video conferencing implementations. For example, in the presentation service 140 as disclosed and further described herein, a group of individuals may select audience seating within the user interface that are a linear set of seats, e.g., 5 seats in a row, that are available (e.g.,, have not been already selected by others attending the electronic presentation) or a geometric pattern of selected seats in the user interface, e.g., a 3×3 grid of seating locations that are available for selection.

Continuing with the user interface of auditorium 300, central interface 310 is controlled by presenter device 110, and may include any information presenter device 110 shares. Exemplary outputs on central interface 310 include a user streaming video (e.g., a webcam video of a presenter), sharing a screen or a file (e.g., sharing presentation slides), and/or sharing or streaming any other visual content. Audio content may accompany the video content (e.g., the presenter's voice, background music, or any other audio commanded to be output by presenter device 110). Central interface module 210 updates central interface 310 based on commands from presenter device 110. As depicted, central interface module 210 may provide a default display until such a time that the presenter begins the electronic presentation. Central interface module 210 may customize the default display based on a command from presenter device 110 (e.g., showing a customized welcome slide rather than a typical default image).

Turning back to FIG. 2, manual seat selection module 211 is configured to process a seat selection by an audience member. Manual seat selection module 211 detects that an audience device 120 has joined the electronic presentation. Turning briefly again to FIG. 3, seats 320 are represented as tiles in auditorium 300. This representation is non-limiting and exemplary; seats 320 may be depicted in any form. Manual seat selection module 211 detects a selection from audience device 120 of a given seat. Manual seat selection module 211 may determine whether the selected seat is vacant and/or not reserved, and may, responsive to detecting that the seat is in fact vacant, assign the audience member to the seat. Audience members may request to move to different seats, in which case manual seat selection module 211 processes such requests in similar fashion.

Automated seat selection module 212 is configured to select a seat automatically for a user. Automated seat selection module 212 may assign a seat for a user responsive to detecting a trigger event. Exemplary trigger events may include detecting that the user has entered the room, detecting a rearrangement request from a presenter, detecting a rearrangement request from an audience member, and the like. In an embodiment, seats may be segmented into sections (e.g., a fan section and a non-fan section). Automated seat selection module 212 may detect a request to be seated in a particular section, and may automatically assign the seat to the user within the requested section.

Automated seat selection module 212 may assign the seat using any heuristic. In an embodiment, automated seat selection module 212 may access a graph where edges in the graph indicate a strength of relationship between an audience member and other audience members. Automated seat selection module 212 may assign the audience member to a seat that is near one or more audience members with which the audience member has a relationship. In an embodiment, automated seat selection module 212 may determine preferences of the audience members and seat those members based on their preferences (e.g., a preference to sit in the front or back).

Seat visualization module 213 may be configured to render avatars, pictures, and/or other images of audience members. The images may be embedded with a corresponding audience member selected seat. In an embodiment, seat visualization module 213 uses a default image when an audience member is assigned to a seat. The default image may be, for example, a profile image of the user. The profile image may be stored in file corresponding to a user account (or audience member account) and stored in a user account database of the presentation service 140. It is noted that the user account and/or the storage in the user database may be long term or temporary and may be encrypted. Where no profile image is found, seat visualization module 213 may assign any default image in lieu of a profile image.

Audience members may command (e.g., using selectable options to do so) that their image be changed to a desired image. In an embodiment, seat visualization module 213 may receive a request to modify the seat image into a letter with a particular background (e.g., a white color background). Where users seated adjacent to one another coordinate, such functionality enables a banner to be created. For example, a "BEIJING" banner can be seen in seats 320. In an embodiment, seat visualization module 213 may prompt audience members as to whether they wish to join in a particular banner. Seat visualization module 213 may output the prompt based on detecting that neighbors are forming a banner (e.g., "BEIJIN" is detected), and the prompt may recommend a particular transformation of the seat image (e.g., recommend that a "G" be used to complete the "BEIJING" banner). The prompt may be output based on other factors, such as another user requesting that the prompted user change their image to a requested image. A user may select a word for a banner to be formed, and the user or the seat visualization module 213 may transmit a request to adjacent users to join the banner. In some embodiments, a leader of an audience segment, such as a manager of a company segment in the audience, may input words that may be formed in banners, and other users in the segment may select to be visually represented by a portion of one of the banners. In response to a banner being completed, seat visualization module 213 may emphasize the banner. For example, seat visualization module 213 may temporarily increase a size or brightness of the completed banner, cause the banner to animate, cause the banner to move across multiple seats, or emphasize the banner in any other suitable manner. In an embodiment, seat visualization module 213 may embed videos, or sequences of frames, of users at seats. For example, webcam videos, or portions thereof (e.g., one frame every predefined period of time, such as every 5 seconds) may be used to form the image.

Seat visualization image may automatically change visualization based on activity of individual audience members. Where an audience member minimizes a user interface showing audience 300 (e.g., is looking at an e-mail window rather than the electronic presentation), or has gone idle for a predetermined threshold of time, seat visualization module 213 may alter the representation of that audience member's seat (e.g., by using gray, or showing a snooze icon, to show that the audience member is not paying full attention).

Seat expansion module 214 determines whether, and how, to add seats to auditorium 300. Auditorium 300 may have a size and configuration that is predefined, either by default (e.g., based on a number of expected audience members), or by the presenter (e.g., where the presenter specifies the number of seats and/or the layout of those seats). Seat expansion module 214 determines that the seats are at, or are near, capacity (e.g., less than a threshold number or percentage of seats remain). Seat expansion module 214 may shrink seats 320 in order to add more seats to the sides and/or back and/or front of auditorium 300. Seat expansion module 214 may, rather than shrinking seats 320, add seats to the back of auditorium 300. These seats may be seen the current user interface view or may be added below and/or above and/or to one or both sides of the fold of the display area on a screen of a user device (e.g., image window on presenter device and/or audience device). Hence, where auditorium 300 is larger than an image window, auditorium 300 may become scrollable, where a user may determine what part of auditorium 300 to view by scrolling upward or downward (or from side to side if seats are populated on the side).

Chat group assignment module 215 assigns audience members to chat groups. As seen in FIG. 3, chat bar 330 may be used to chat with some other audience members. Chat group assignment module 215 determines who those audience members are. In an embodiment, chat group assignment module 215 automatically assigns users to a chat group based on where in auditorium 300 those users are sitting. For example, chat group assignment module 215 may assign the users to a chat group including all users within a predefined number of seats of a given audience members (e.g., within 1 seat of the audience member in any direction). Such assignment would replicate the feeling of being able to whisper to your neighbor during a presentation in a physical auditorium. As users change seats, chat group assignment module 215 may reassign chat groups accordingly. Chat group assignment module 215 may assign a user to multiple chat groups (e.g., a chat group may form with audience members to the left of the user, and another chat group may form with audience members to the right of the user); the user may toggle between multiple chat groups. A user may disable or leave a given chat group, and may invite other users to join a given chat group; chat group assignment 215 may enable such activity.

Seat reservation module 216 reserves one or more seats for particular audience members. Seat reservations may be requested by a presenter, an organizer of the electronic presentation, and/or an audience member. Types of seat reservation requests may include a request to have a particular person seated in a particular seat, a particular section, and/or in proximity to particular other people. For example, the presenter may request that a special guest be seated in a front row seat. As another example, an audience member may request that the member be seated in a particular section (e.g., a fan section, which is a designated group of seats 320 that together form that section). Seat reservation module 216 may store reservation requests to memory, and may indicate to automated seat selection module 212 to reference stored reservation requests in order to guide automatic seat selection.

Figure 4:
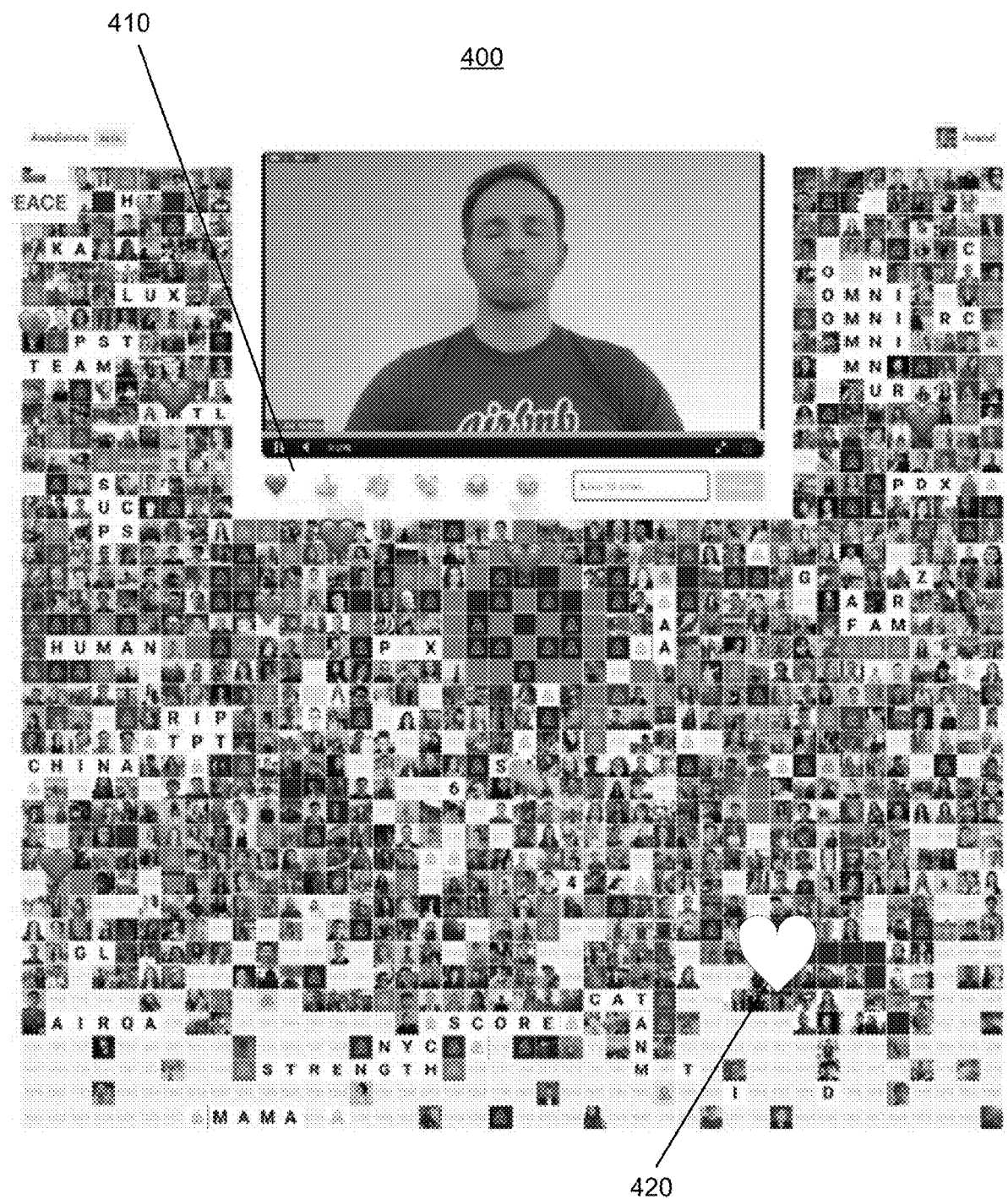
FIG. 4 depicts emotes input by users of the exemplary user interface.

Emote detection module 217 detects emotes emitted from audience devices 120. As used herein, the term emote may refer to input of a given audience member that is output for display to other audience members. FIG. 4 depicts emotes input by users of the exemplary user interface. We now turn briefly to FIG. 4 to further illustrate emote selection and display. User interface 400 includes emote selection module 410, and emote outputs 420. Emote selection module includes various exemplary selectable options. Emote selection module 410 may dynamically vary the selectable options presented via the user interface 400. For example, emote selection module 410 may comprise an emote recommendation engine that analyzes audio, video, or a transcript of content being presented or user responses. In response to detecting words or sounds indicative of a joke, emote selection module 410 may provide a laughing emote as a selectable option. In response to detecting a frown in a video stream of a user, emote selection module 410 may present a frowning emote as a selectable option. Responsive to selection of a selectable option at an audience device 120, emote detection module 217 detects an emote. An audience member may also type a string to be output as an emote. The string may be limited (e.g., as depicted, the maximum length of the text string is 15 characters). Responsive to selection of a selectable option (e.g., selection of the "shout" button, or the pressing of an "enter" key on a keyboard), emote detection module 217 detects an emote to be emitted from the audience device.

Emote output module 218 outputs some or all detected emotes to auditorium 300. As depicted in FIG. 4, emote output module 218 may cause emote outputs 420 to protrude from a seat of the user who input the emote. For example, where a heart emoji was selected, emote output module 218 may show a heart emoji that has a base pointing within a particular audience member's seat, thus indicating to other audience members the person who output the emote. Emote output module 218 may animate the emote, causing the emote to move, float, expand, shrink, fade, grow stronger, etc., thus sometimes partially or fully obscuring other users' seats (e.g., to call attention to the emote). A user may input multiple emotes within a short period of time, thus causing emotes to partially stack on top of one another as they go through an animation sequence.

Emote output module 218 may detect emotes input from multiple users at a same or overlapping time. Thus, multiple emotes may appear to members of audience 300 simultaneously. Given that there may be a large number of audience members (e.g., thousands), processing and displaying all input emotes may be impractical or impossible due to bandwidth constraints and/or processing constraints. Emote output module 218 may thus selectively discard some emote requests. In an embodiment, where a user selects many emotes in rapid succession (e.g., constantly clicking an applause emoji icon to indicate applause), emote output module 218 may limit emotes that are to be displayed based on a predetermined formula (e.g., only output one emote per half second), thus avoiding processing many emotes in rapid succession from many users. Emote output module 218 may limit the number of emotes to be displayed in a given neighborhood of seats. For example, within a radius of ten seats, emote output module 218 may limit the number of displayed emotes to be no greater than two emotes per half second.

Emote output module 218 may augment emotes with audio. For example, emote output module 218 may determine whether a threshold number of emotes, or a threshold number of emotes of one or more predefined types, have been input by the audience members within a predetermined amount of time (e.g., within 5 seconds of one another). Emote output module 218 may, responsive to determining that the threshold has been crossed, output audio along with the emotes (e.g., applause sound where a threshold number of users selected the applause emoji within a given time interval, or where the applause emoji was selected a threshold amount of times within the given time interval). Emote output module 218 may map the detected emotes to a table of audio sounds to be output. For example, for a laughing emote, the table may map to a stock recording of laughter, and emote output module 218 may augment the laughing emote with the laughter recording. Emote output module 218 may vary the intensity or volume of the audio based on the amount and/or rate at which a given emote is detected.

Emote aggregation module 219 accentuates, emphasizes, or otherwise aggregates emotes responsive to detecting that one or more predefined conditions are met. For example, responsive to detecting that a predetermined number of audience members are using the applaud emoji within a short interval of time, emote aggregation module 219 may output a graphic that corresponds to the detected activity, such as a large applause emoji over the audience. Emote aggregation module 219 may perform such detection across the audience at large, and/or may perform such detection across predefined sections of the audience and/or undefined clusters of the audience. For example, in a scenario where fans of two different causes are seated in different sections of the auditorium, where fans of one side are using applause emojis, emote aggregation module 219 may overlay a large applause emoji (or similar) over the applauding section, rather than over the entire audience. Conditions may be defined that describe undefined clusters (e.g., where at least 70% of a group of seats within a predefined radius (e.g., 10+ seats) are using the same or similar emotes, perform an emote aggregation). Where the entire audience is engaged, emote aggregation module 219 may perform activity that affects auditorium 300 and/or central interface 310, such as showing fireworks or other celebratory imagery and/or including corresponding audio. By aggregating multiple individual emotes into an aggregated emote, emote aggregation module 219 may decrease bandwidth requirements and decrease memory or lag issues, both for the presentation service 140, as well as for the audience devices 120. In some embodiments, emote aggregation module 219 may detect a technical specification, such as an internet speed, and emote aggregation module 219 may modify the number of emotes that are aggregated into an aggregated emote.

In some embodiments, emote aggregation module 219 may generate a haptic feedback for outputting to a presenter. The presenter may have a device, such as a smartwatch or smartphone, that is capable of providing haptic feedback, such as by vibrating. In response to a threshold amount of emotes being detected, emote aggregation module 219 may instructed the presenter's device to provide haptic feedback. For example, in response to detecting one hundred applause emotes, emote aggregation module 219 may instruct the presenter's device to vibrate. Different haptic feedback may correspond to different emote types. For example, emote aggregation module 219 may instruct the presenter's device to vibrate continuously in response to detecting thumbs up emotes, or to vibrate in pulses in response to detecting thumbs down emotes.

Automatic emote module 220 determines whether to automatically output an emoji on behalf of an audience member. An audience member may have a camera (e.g., a webcam or integrated camera in a client device) and/or microphone that detects activity of audience member during the presentation. The audience member may opt in or out of activity of automatic emote module 220. Automatic emote module 220 receives a feed of images or video and/or audio from the user, and determines therefrom whether the user is performing activity that corresponds to an emote. For example, where the user is visibly or audibly laughing, automatic emote module 220 may detect the laughter and may output one or more emojis corresponding to the laughter. The intensity and/or volume of the laughter may cause automatic emote module 220 to output more than one laugh emoji and may be used to determine a rate at which laugh emojis are output. In some embodiments, automatic emote module 220 may comprise a machine learning model trained to detect audience member activities using a training set of images, videos, and/or audio clips, which are labeled with an emotion or emote. Audience emote module 220 may apply the machine learning model to the feed of images or video to determine an emote to output on behalf of an audience member.

As another example, where the user is visibly or audibly clapping, automatic emote module 220 may detect the clapping and may automatically output an applause emoji on behalf of the user. Again, the intensity and/or volume of the clapping may cause automatic emote module 220 to output more than one applause emoji and may be used to determine a rate at which applause emojis are output. This can be extended to any emotion of the user—crying, smiling, waving, expressions of love (that correspond to a heart emoji), and so on.

Additional viewing room module 221 may be used to generate and/or manage rooms other than auditorium 300 that are otherwise connected to auditorium 300 (e.g., overflow rooms and/or private rooms). In one example embodiment, user interface 400 may be configured to include two or more "tabs", e.g., at an edge of the display area of the user interface on the screen. Each tab corresponds to a specific view of seating and each tab may be toggled between. For example, Tab 1 may correspond to the full audience view of auditorium 300 with central interface 310 at a location within the display area, e.g., the top of a display area. Tab 2 may correspond to a private viewing room (e.g., an overflow room or a reserved room). The private viewing room may be configured to have central interface 300, but possibly in a different location, e.g., along a top or side, and may have audience seating that is more limited, e.g., a predetermined number of seats that is less than the overall audience seating, e.g., 20 seats.

Additional viewing room module 221 may provide additional tabs for different private rooms. Each private room tab may be structured to allow a smaller subset of the audience to gather and view the view port, but also may allow for creation of a smaller environment within which additional functionality may be structured. For example, for each private room tab, a chat may be configured just for that tab. Additional functionality may be included such as on online "whiteboard" for participants in that room to share thoughts. A user (e.g., an audience member) may "move" from a first private room, e.g., a tab 2, to a second private room, e.g., a tab 3. In that move, additional viewing room module 221 may take the user out of the functionality of first private room where they initially were and the user may have functionality assigned from the second private room, e.g., tab 3. In alternate example embodiments, due to the online configuration, the user may be "active" in two or more private viewing rooms as well as the main audience room, e.g., tab 1. In some embodiments, viewing room module 221 may generate a private room and assign multiple groups of audience members having different viewpoints to the private room. For example, a first group of audience members may select a positive emote, and a second group of audience members may select a negative emote. The viewing room module 221 may assign the first group and the second group to the private room, so that the groups may include multiple viewpoints which may encourage discussion of the content being presented.

In one example embodiment, the lobby module 222 may be configured to present a lobby. The lobby may be a separate "tab" in the user interface. In an alternate example embodiment, the lobby may be a separate viewing area in a primary user interface. The lobby may be enabled by lobby module 222 and may be configured by the system or by a user. The lobby corresponds to a location where one or more users "meet" before, during or after an event that is broadcast through the view port. The lobby may be configured so that the user can provide an indication to lobby module 222 that the user would like to be placed in the lobby. Users may be allowed into the lobby based on parameters set by lobby module 222, e.g., members of a specifically assigned group, or may be set by a user that may permission other users to enter the lobby. The number of individuals in a lobby may be capped. By way of example, the lobby may be used to create a group of users that would sit in seats close together. In this example, a user (or a set of users) may select a geometric arrangement for the seating, e.g., a "L" or "U" shaped, square, or linear arrangement. Based on the geometric arrangement selected, the audience user interface may outline available seats to fit the users in the lobby. As with other configurations, the lobby may be configured with other functionality, e.g., chat group, which remains within the audience. In another example embodiment, the lobby may be used as a gathering place during or after a broadcast for the group in the lobby to continue communications.

Figure 5:
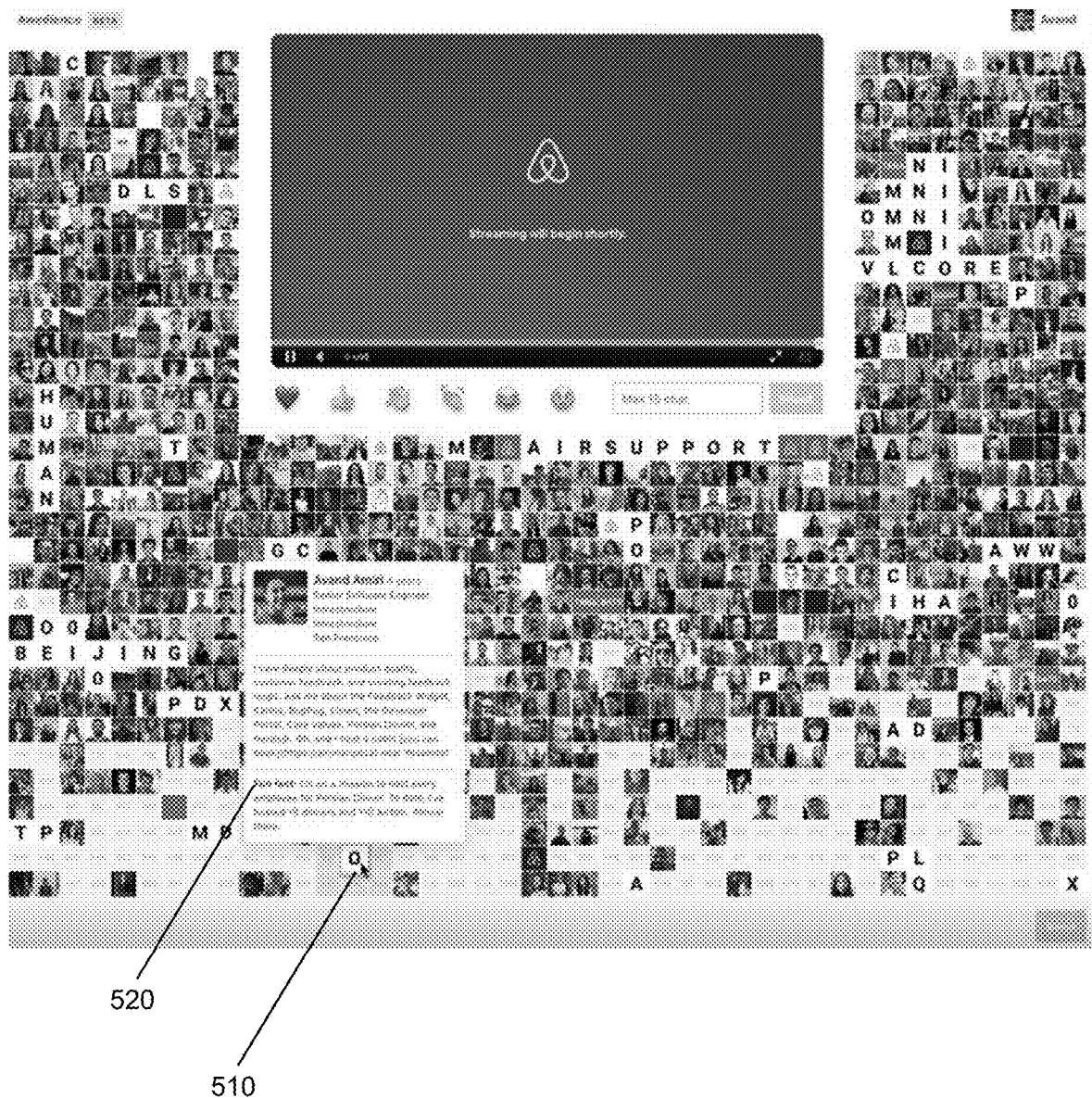
FIG. 5 depicts a depiction of a profile card within the exemplary user interface.

Profile card generation module 223 generates a profile card for display on an audience device 120 responsive to a condition being met. For example, responsive to detecting that a seat of a user is selected (e.g., based on a hovering over that seat for a period of time, a clicking or touching of a touch screen over the seat, or any other means of selection), profile card generation module 223 may provide the profile card for display on the audience device 120. FIG. 5 depicts a depiction of a profile card within the exemplary user interface. As depicted in FIG. 5, a cursor is hovering over seat 510. Responsive to detecting that condition, profile card generation module 223 generates profile card 520. Profile card generation module 223 may generate the profile card using profile information of the user. Profile information may be predetermined, or may be harvested from public information about the user (e.g., social networking photos, public bios, etc.).

Presentation report generation module 224 generates a presentation report for the presenter. The presentation report may be depicted to the presenter in real-time or substantially real time, and/or may be output to the presenter following the end of the presentation. The presentation report may indicate aggregate representations of audience emotes over time. Presentation report generation module 224 may generate a transcript of the presentation, and may overlay the transcript with the aggregate representations. Where real-time or substantially-real-time presentation reports are generated for the presenter, the presenter may see real-time feedback, which may cause the presenter to adjust or adapt his or her style. For example, output emojis, amount of people that have gone idle or are not paying attention, etc., may be shown in real time to the presenter.

Profile database 250 stores profile information of audience members. Profile information may be populated based on input by the audience members (e.g., name, picture, biographical information, fun facts, and so on). Presentation service 140 may populate and/or augment profile information stored in profile database 250 automatically (e.g., by scraping data from web pages and/or social media pages).

Computing Machine Architecture

Figure 6:
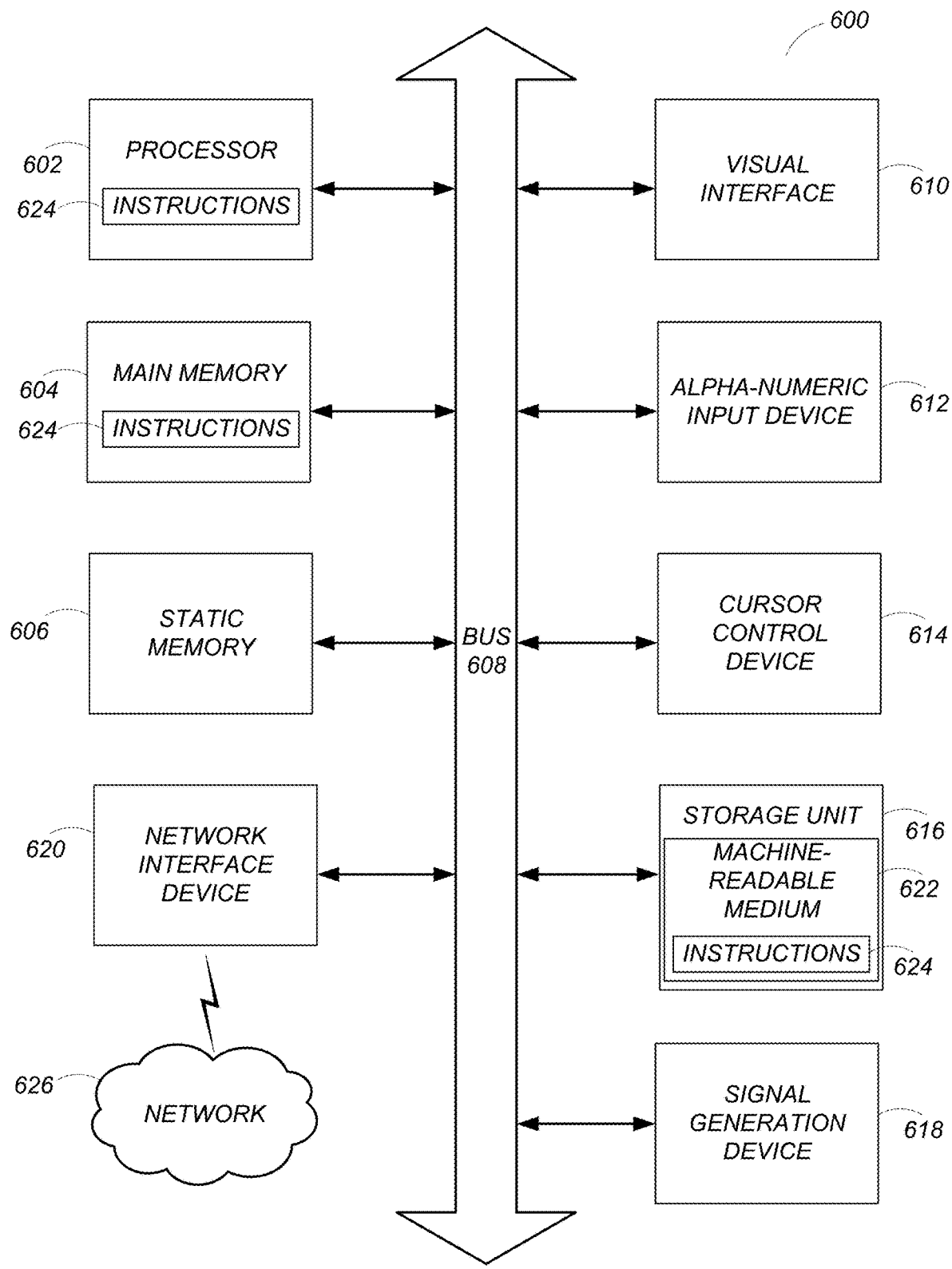
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Alternate Exemplary User Interfaces

FIGS. 7A-7D depict exemplary alternate user interfaces operated by the presentation service. As was mentioned above, layout features of auditorium 300 are merely exemplary, and any configuration consistent with this disclosure may be used. As shown in FIG. 7, seats of user interface 700A may be laid out in another format, such as a format resembling a stadium, rather than an auditorium. User interface 700A also includes additional exemplary emotes and functionality, such as additional emoji options, an option to submit a question, and an option to search the crowd (e.g., to find where a friend is seated). User interface 700B is similar to user interface 700A, except with a different layout of seats that resembles priority or backstage seating (shown on the right) as well as general seating. The priority seating may be subject to reservations, as disclosed above with reference to FIG. 2.

Figure 7A:
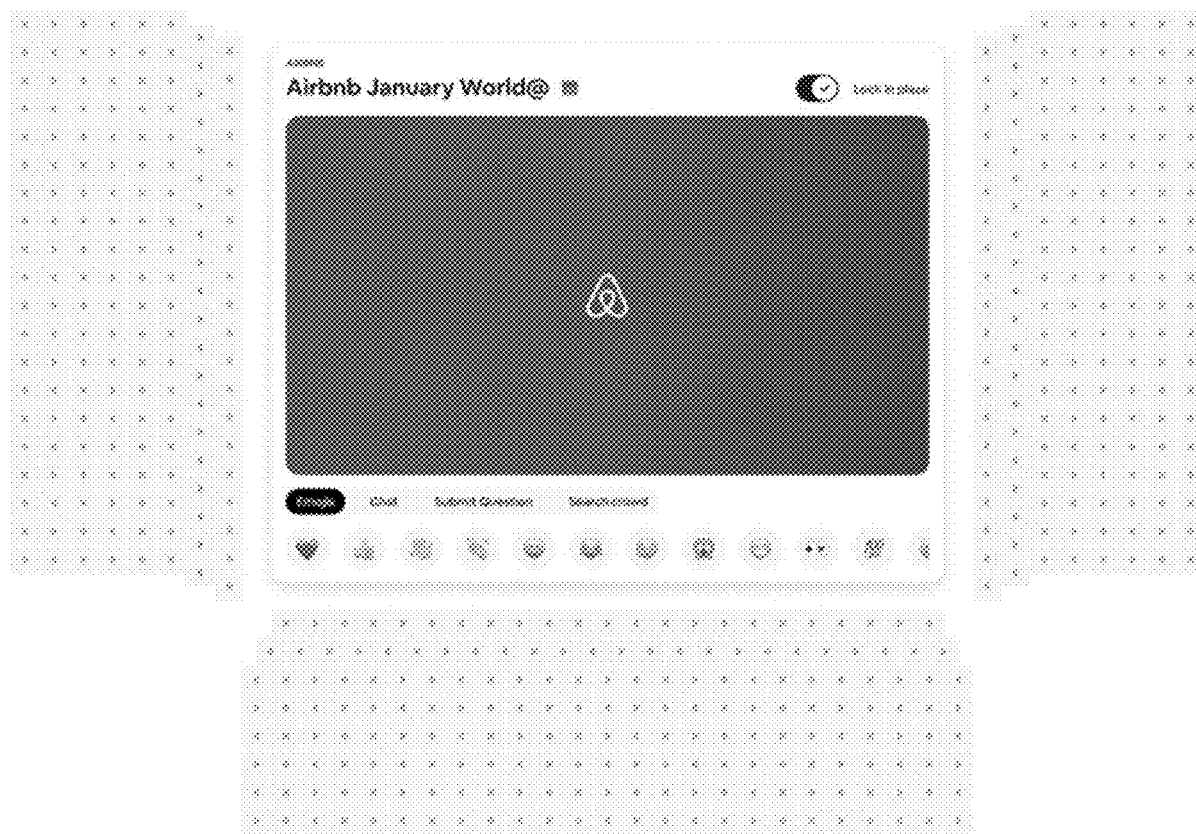
FIGS. 7A-7D depict exemplary alternate user interfaces operated by the presentation service.
Figure 7B:
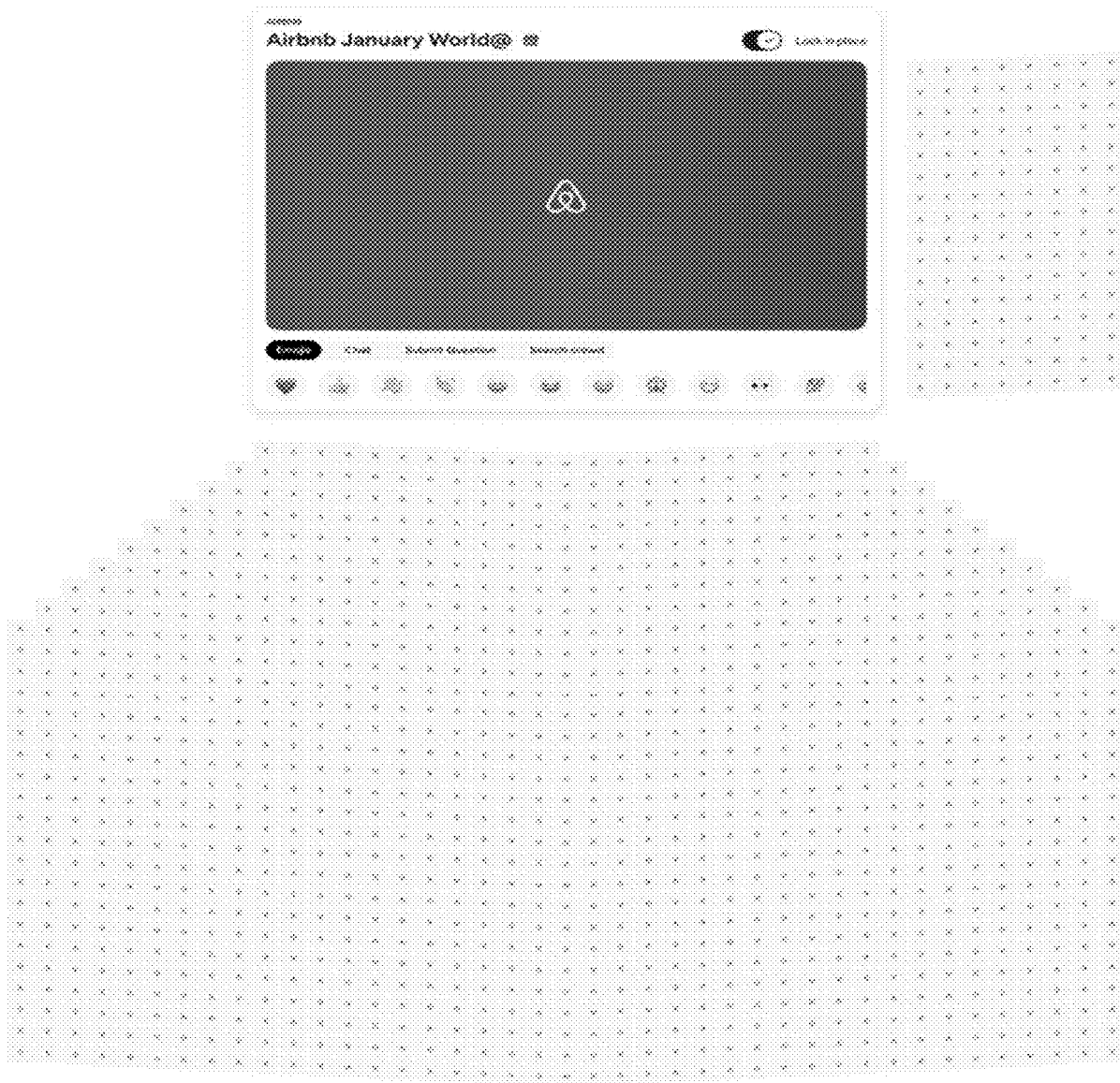
Figure 7C:
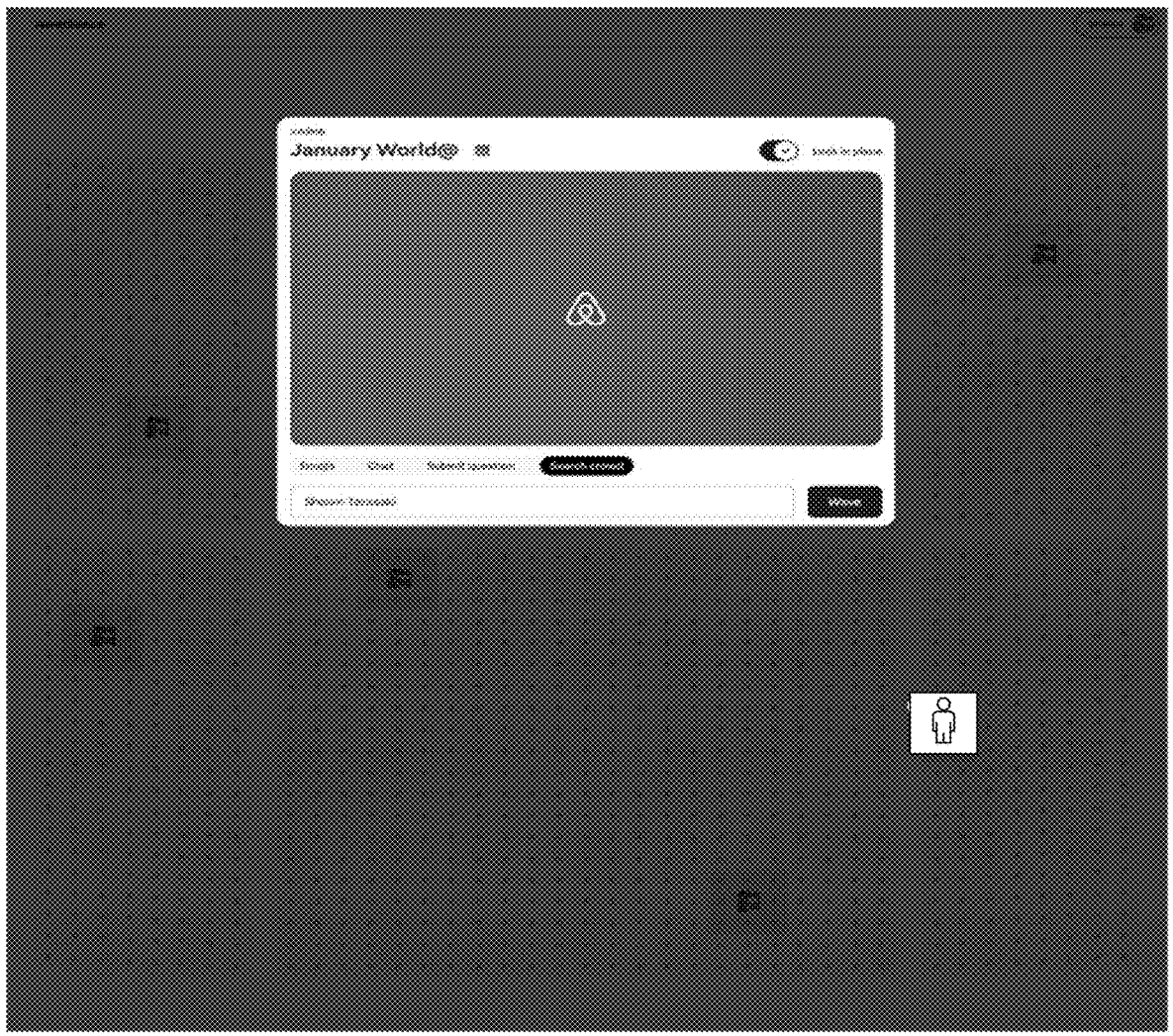
Figure 7D:
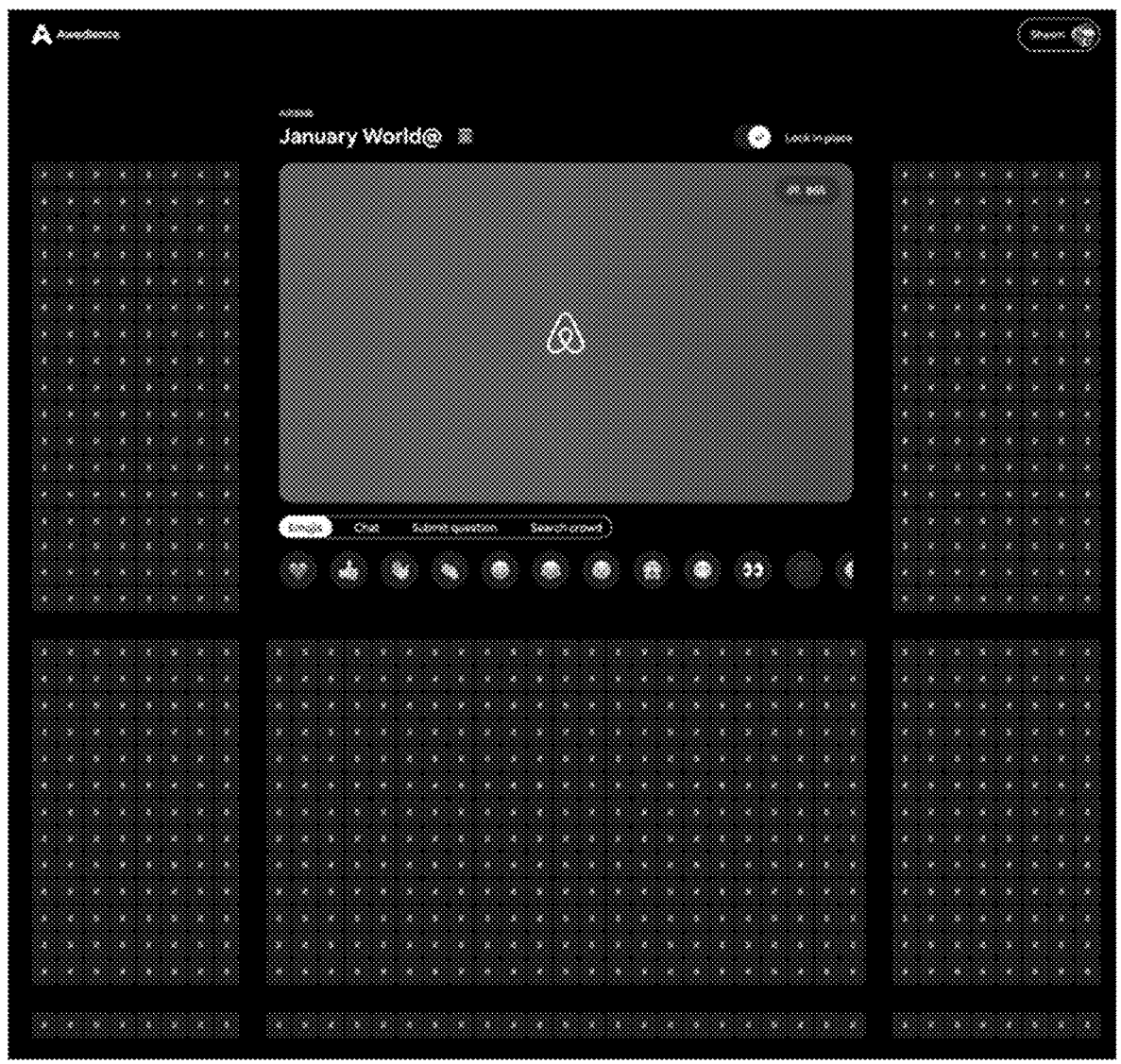

FIG. 7C shows a user search mode, where an audience member may search for another audience member. The audience member may type in a name and search for audience members. User interface 700C may provide an interface to allow a chat or other communications between the audience members. The user interface 700C may place the auditorium in dark mode, where user interface 700C has dimmed the auditorium other than the location of the user being searched for. In some embodiments, dark mode may resemble a darkened movie theater, where users are asked to not use their mobile devices and to be silent. To this end, in dark mode, optionally, some options for emoting may be disabled. Silent options to emote, may be enabled (e.g., waving to a friend, as depicted). FIG. 7D shows, in user interface 700D, an embodiment of a dark mode layout.

Use Case Examples of a Presentation Service

Figure 8:
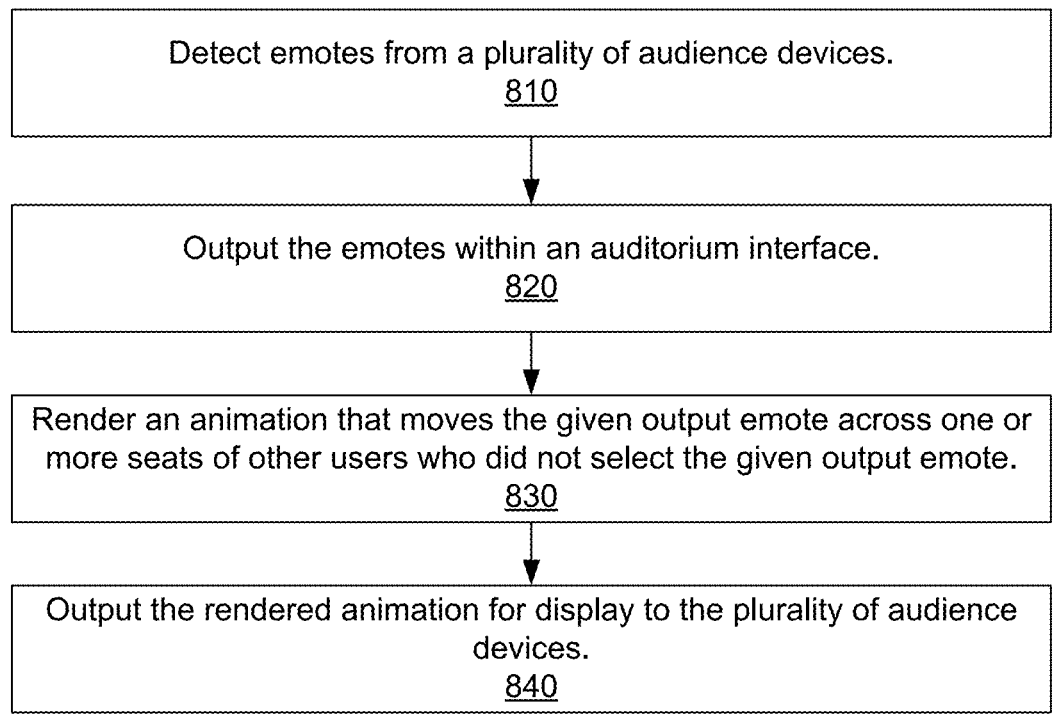
FIG. 8 illustrates a flowchart for a process for rendering animated emotes, in accordance with an embodiment.

FIG. 8 illustrates a flowchart 800 for a process for rendering animated emotes, in accordance with an embodiment. A presentation service may detect 810 emotes from a plurality of audience devices. The presentation service may be an embodiment of the presentation service 140 of FIG. 1. Users of the audience devices may input the emotes to express their opinions or emotions during a presentation in a virtual auditorium.

In some embodiments, the presentation service may provide a plurality of selectable emotes for display on an audience device. For example, emote detection module 217 may provide a thumbs up emote and a thumbs down emote for display on an audience device, and the user may click on the respective emote to input the emote to the presentation service.

In some embodiments, the presentation service may detect multiple emotes from a single user. For example, a user may select the same or different emotes many times in quick succession. Displaying each of the emotes would potentially obscure much of the auditorium interface and increase processing demands. The presentation service may display the multiple emotes in a stacked arrangement. For example, the stacked arrangement may comprise multiple overlapping emotes, such that it is visually apparent that multiple emotes are being displayed, without displaying the full size of each individual emote.

The presentation service may output 820 the emotes within an auditorium interface for display to the plurality of audience devices. The auditorium interface may display the presentation of the virtual auditorium. Each of the emotes may be output by emote output module 218 in association with a seat corresponding to users who selected the emotes. For example, a user who is virtually placed in a seat may select an emote, and the auditorium interface may display the emote in a location corresponding to the user's seat.

The presentation service may render 830 an animation that moves the given output emote across one or more seats of other users who did not select the given output emote. For example, a user may select a heart emote, and the emote may be initially displayed over the seat of the user who selected the emote. The emote may move in a straight line, curved line, spiral, or any other suitable direction over the seats of users who did not select the heart emote.

In some embodiments, the output emote may comprise a directional indicator indicating the seat from which the given output emote originated. For example, for a heart-shaped emote, the base of the heart may point toward the seat from which the given output emote originated. In some embodiments, the movement of the emote may indicate the seat from which the emote originated. For example, the emote may move in a circle around the seat from which the emote originated.

The presentation service may output 840 the rendered animation for display to the plurality of audience devices. The users attending the presentation, as well as users presenting the presentation, may view the emotes being selected by other attendees within the auditorium interface.

Figure 9:
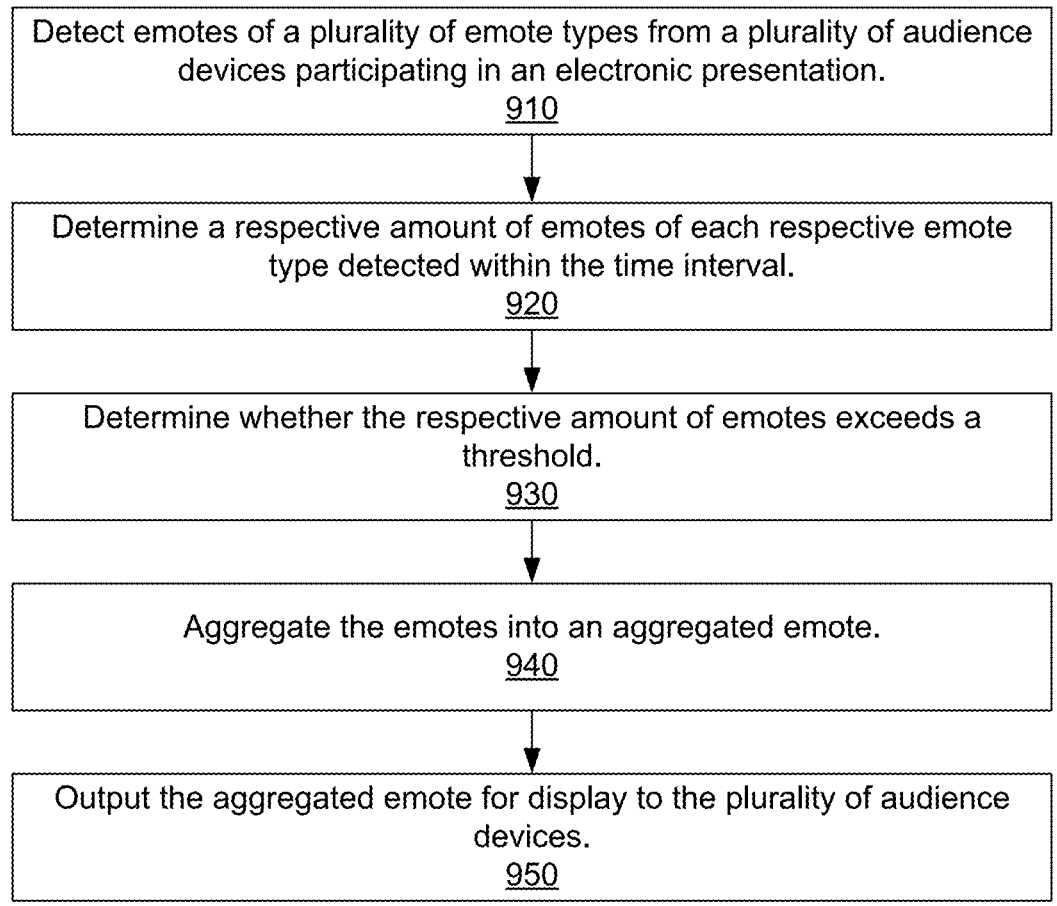
FIG. 9 illustrates a flowchart for a process for aggregating emotes, in accordance with an embodiment.

FIG. 9 illustrates a flowchart 900 for a process for aggregating emotes, in accordance with an embodiment. A presentation service may detect 910 emotes of a plurality of emote types from a plurality of audience devices participating in an electronic presentation. The presentation service may be an embodiment of the presentation service 140 of FIG. 1. The presentation service may detect multiple emote types which signify different reactions from users of audience devices. For example, the emote detection module 217 may detect thumbs up emotes indicating a positive user response to presented content, and the presentation service may detect thumbs down emotes indicating a negative user response to presented content. The plurality of emote types may be detected within a time interval, such as within a five second interval, or within a one minute interval, or within any suitable length of a time interval.

The presentation service may determine 920 a respective amount of emotes of each respective emote type detected within the time interval. For example, the presentation service may detect one hundred emotes of a first emote type during a one minute interval, and the presentation service may detect ten emotes of a second emote type during the one minute interval.

The presentation service may determine 930 whether the respective amount of emotes exceeds a threshold. For example, the threshold may be fifty emotes of a given emote type during a one minute interval, and the presentation service may evaluate which emote types have been received at a rate greater than fifty emotes per minute. In some embodiments, a single user may select emotes at a rate faster than a single user threshold rate. The presentation service may discard a subset of the emotes selected by the user, and only output the non-discarded emotes for display to the plurality of audience devices. For example, if a user selects a heart emote one hundred times in one minute, the presentation service may output emotes from the user at a maximum rate of one emote per minute for display on the plurality of audience devices.

The presentation service may aggregate 940 the emotes into an aggregated emote. In audience interfaces in which many users are virtually represented, it may be aesthetically challenging to display every emote selected by each user. Additionally, displaying each emote individually may create processing demands both on the presentation service, as well as on each audience device, which degrades the performance of the electronic presentation. Rather than displaying each emote individually, the emote aggregation module 219 may combine multiple emotes into one or more aggregated emotes representing the plurality of individual emotes.

In some embodiments, the aggregated emote may be larger than a single emote representing an emote selected by one user of an audience device. The size or magnitude of the aggregated emote may be scaled proportional to, or as a function of, the number of users and/or number of times that a given emote was detected.

The presentation service may output 950 the aggregated emote for display to the plurality of audience devices. The presentation service may generate an auditorium interface comprising virtual seats representation the locations of users of audience devices. The emote output module 218 may output the aggregated emote in association with a location of seats corresponding to users who selected the emotes that were aggregated into the aggregated emote. For example, if the emotes from five users were aggregated into an aggregated emote, the presentation service may output the aggregated emote at a location between the seats corresponding to the five users. In some embodiments, the aggregated emote may be animated and move between the locations of various users who selected the emote.

Figure 10:
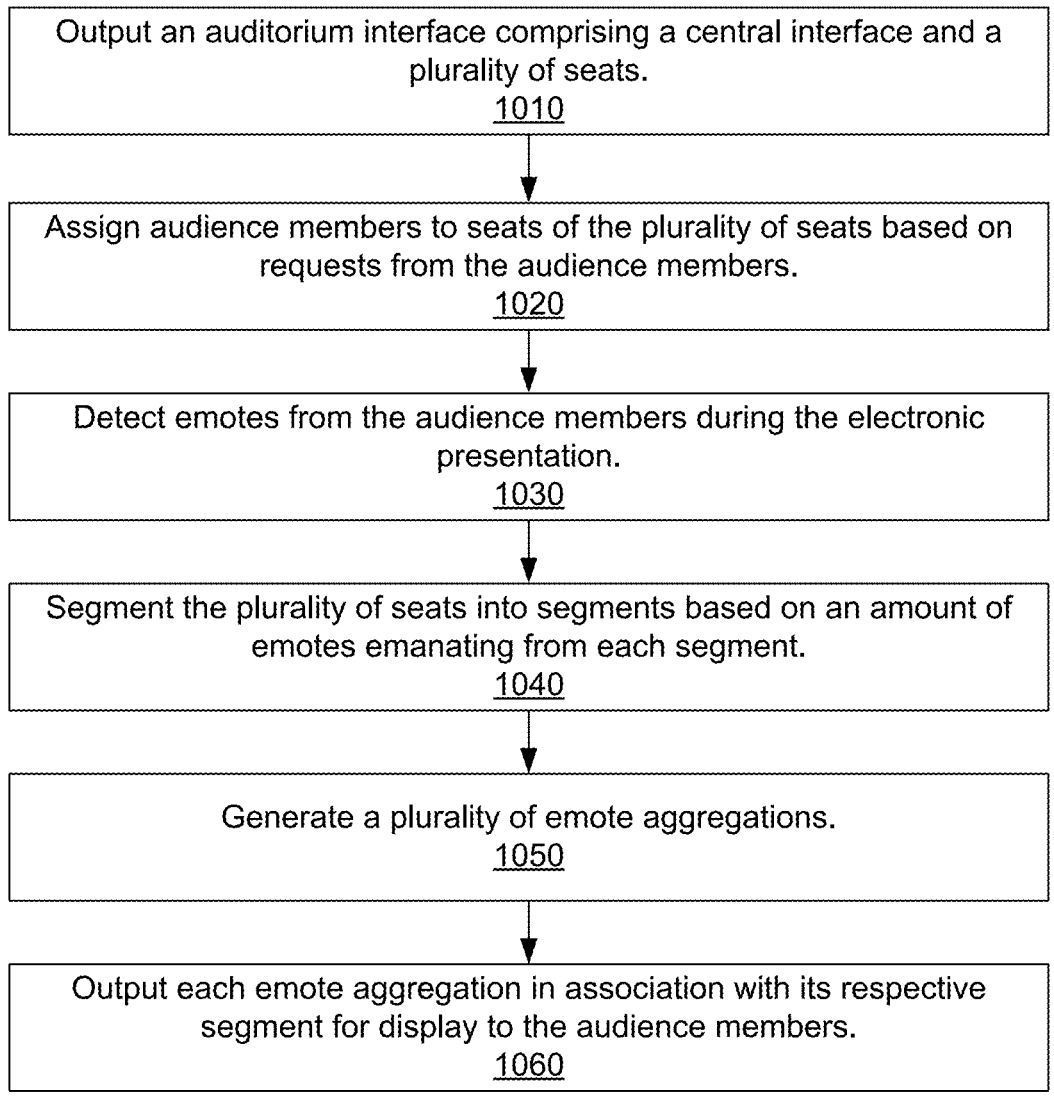
FIG. 10 illustrates a flowchart 1000 for a process for outputting emotes based on an audience segment, in accordance with an embodiment.

FIG. 10 illustrates a flowchart 1000 for a process for outputting emotes based on an audience segment, in accordance with an embodiment. A presentation service may output 1010 an auditorium interface comprising a central interface and a plurality of seats. The presentation service may be an embodiment of the presentation service 140 of FIG. 1. The central interface may output an electronic presentation. For example, the central interface may comprise a video stream of an person speaking.

The presentation service may assign 1020 audience members to seats of the plurality of seats based on requests from the audience members. In some embodiments, the requests from the audience members may be received in real time. For example, when the audience member joins the auditorium interface, the audience member may select a specific seat, the audience member may indicate a group they are associated with (e.g., a company or division), the audience member may select a viewpoint (e.g., in favor of the speaker's thesis), or the audience member may input any other suitable request which may allow the manual seat selection module 211 or automated seat selection module 212 to assign the audience member to a seat. In some embodiments, the presentation service may retrieve user requests from a user profile, and use preferences in the user profile to assign the audience member to a seat.

The presentation service may detect 1030 emotes from the audience members during the electronic presentation. One or more audience members may input emotes at various times throughout the electronic presentation, and the emotes may be detected by the emote detection module 217.

The presentation service may segment 1040 the plurality of seats into segments based on an amount of emotes emanating from each segment. The presentation service may segment the plurality of seats in response to detecting a threshold amount of emotes from the audience members within an interval of time. For example, in response to detecting at least fifty heart emotes within on minute, the presentation service may group all users that selected a heart emote into a segment.

The presentation service may generate 1050 a plurality of emote aggregations. One or more of the emote aggregations may correspond to a segment. Each emote aggregation generated by the emote aggregation module 219 may comprise a magnitude that corresponds to the amount of emotes emanating from its respective segment. For example, the size of the displayed emote may be a function of the number of emotes received from audience members in a segment.

In some embodiments, an emote aggregation for a first segment and an emote aggregation for a second segment may comprises different magnitudes. For example, if one hundred audience members in the first segment select a first emote, and fifty audience members in the second segment select a second emote, the first emote may be output at a greater magnitude (e.g., size, brightness, volume) than the second emote.

The presentation service may output 1060 each emote aggregation in association with its respective segment for display to the audience members. For example, the emote aggregation may be displayed in a location of the auditorium interface corresponding to the segment of the users.

In some embodiments, the presentation service may combine emote aggregations from different segments. For example, two different segments may each comprise a heart emote aggregation. In response to each heart emote aggregation increasing above a threshold magnitude, the presentation service may combine the two heart emote aggregations into one larger heart emote aggregation. In some embodiments, the presentation service may combine emote aggregations of different types. For example, in response to a first segment having a thumbs up emote aggregation above a threshold magnitude and a second segment having a thumbs down emote aggregation above a threshold magnitude, the presentation service may combine the two emote aggregations in to a controversial topic emote aggregation, indicating that many audience members have differing reactions to the content being presented.

In some embodiments, the presentation service may instruct the audience devices to output an audio signal corresponding to an emote aggregation. For example, if the presentation service generates an applause emote aggregation, the presentation service may instruct the audience devices to output the sound of applause. In some embodiments, the output audio may correspond to the emote aggregation having the greatest magnitude. For example, a first segment may comprise an applaud emote aggregation, and a second segment may comprise a boo emote aggregation. If the magnitude of the boo emote aggregation increases above the magnitude of the applaud emote aggregation, the presentation service may transmit a command to the audience devices to change the audio output from the sound of applause to the sound of boos.

Figure 11:
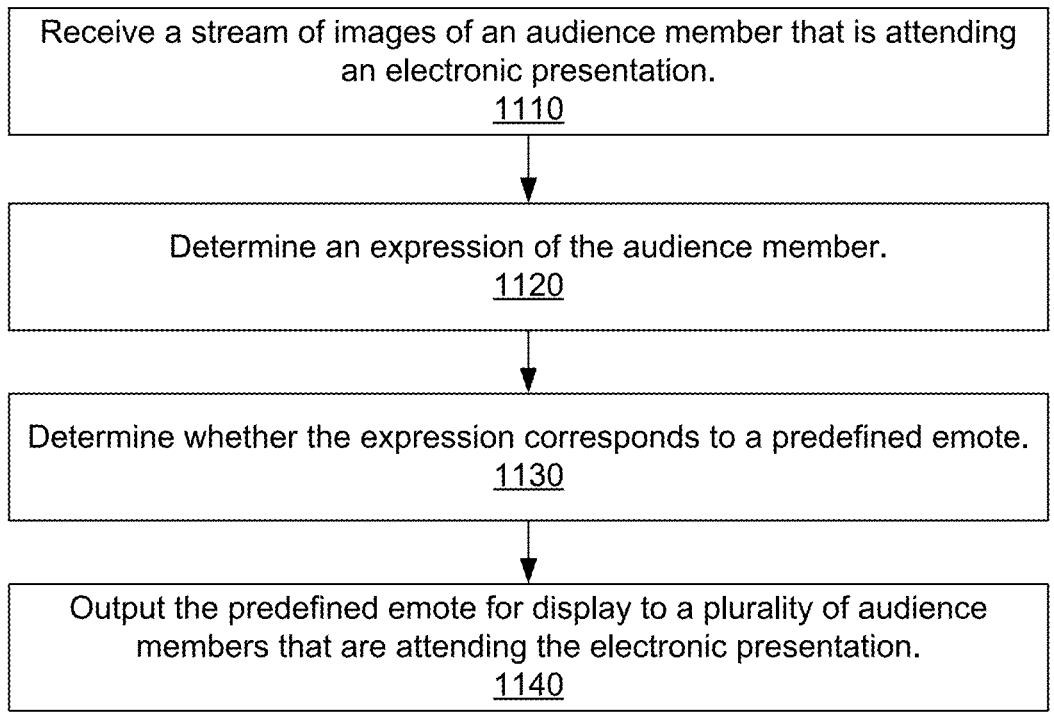
FIG. 11 illustrates a flowchart 1100 for a process for outputting emotes based on an expression of an audience member, in accordance with an embodiment.

FIG. 11 illustrates a flowchart 1100 for a process for outputting emotes based on an expression of an audience member, in accordance with an embodiment. A presentation service may receive 1110 a stream of images of an audience member that is attending an electronic presentation. The presentation service may be an embodiment of the presentation service 140 of FIG. 1. The stream of images may be captured during the electronic presentation. The audience member may be viewing the electronic presentation using an audience device, such as a laptop or smartphone comprising a camera. The audience device may capture video and/or audio of the audience member and transmit the captured data in real time to the presentation service.

The presentation service may determine 1120 an expression of the audience member. The automatic emote module 220 may determine the expression based on a subset of frames of the stream of images. In some embodiments, the presentation service may apply a machine learning model to identify expressions of a user in a still image or video clip. For example, the machine learning model may identify a smile, frown, laugh, yawn, or any other suitable expression. In some embodiments, a machine learning model may analyze an audio stream to determine whether an audience member is performing an activity corresponding to a predefined emote. For example, the machine learning model may identify laughing, crying, sighing, clapping, or any other suitable audible expressions.

The presentation service may determine 1130 whether the expression corresponds to a predefined emote. The presentation service may compare the determined expression to a set of predefined emotes. For example, a predefined emote may comprise a smiley face, and the presentation service may determine that a smile in a video stream corresponds to the predefined smiley face emote.

In some embodiments, the presentation service may analyze the video stream and identify one or more potential emotes corresponding to the expressions of the audience member. The presentation service may transmit selectable options to select one or more predefined emotes to the audience member. The audience member may select one or more of the predefined emotes and the presentation service may output the selected emotes to audience devices.

In some embodiments, the presentation service may determine boundaries of a segment of audience members based on determined expressions of the audience members within a predefined radius of each other. For example, the presentation service may identify ten audience members within a ten chair radius of a first audience member who are all expressing expressions corresponding to the same predefined emote, and the presentation service may create boundaries for a segment containing the ten audience members.

The presentation service may output 1140 the predefined emote for display to a plurality of audience members that are attending the electronic presentation. In some embodiments, the presentation service may generate and output aggregated emotes based on expressions captured from the video streams of multiple audience members.

Additional Configuration Considerations

The systems and methods disclosed herein achieve various technical advantages. For example, crowds with many (e.g., thousands) of attendees are all invited to react to an electronic presentation at once; the systems and methods disclosed herein are enabled to process instant or near-instant reactions while maintaining low latency. An improved user interface is achieved, enabling activity that is only possible in a group setting, such as generating a banner to convey a broader message, and such as aggregating emotes where appropriate. The systems and methods disclosed herein render voluminous emoji reactions in a way that supports, e.g., thousands of participants with no human-perceptible lag.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for implementing an electronic presentation auditorium environment through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A method comprising:
    detecting user-input emotes of a plurality of emote types from a plurality of audience devices participating in an electronic presentation within a time interval, each emote to be output for display to other audience devices;
    determining a number of use-input emotes of each emote type detected from the plurality of audience devices within the time interval;
    determining that the number of use-input emotes for a first emote type exceeds a threshold;
    responsive to determining that the number of use-input emotes for the first emote type exceeds the threshold, augmenting user-input emotes corresponding to the first emote type with audio; and
    outputting the augmented user-input emotes corresponding to the first emote type for display to the plurality of audience devices.

2. The method of claim 1, wherein augmenting user-input emotes corresponding to the first emote type with audio comprises outputting audio along with the emotes corresponding to the first emote type.

3. The method of claim 1, wherein the first emote type is an applause emote type and augmenting user-input emotes corresponding to the first emote type comprises outputting an applause sound along with the user-input emotes corresponding to the first emote type.

4. The method of claim 1, wherein the first emote type is a laughing emote type and augmenting user-input emotes corresponding to the first emote type comprises outputting a laughing recording.

5. The method of claim 1, wherein an intensity or volume of the audio is varied based on an amount or rate at which the user-input emotes corresponding to the first emote type are detected.

6. The method of claim 1, wherein augmenting user-input emotes corresponding to the first emote type with audio comprises mapping the first emote type to a recording in a table of audio sounds to determine audio for augmenting the user-input emotes corresponding to the first emote type.

7. The method of claim 1, further comprising:
    generating haptic feedback for output to a device of a presenter of the electronic presentation based on detecting a threshold number of user-input emotes.

8. A system comprising:
    memory with instructions encoded thereon; and
    one or more processors that, when executing the instructions, are caused to perform operations comprising:
    detecting user-input emotes of a plurality of emote types from a plurality of audience devices participating in an electronic presentation within a time interval, each emote to be output for display to other audience devices;
    determining a number of user-input emotes of each emote type detected from the plurality of audience devices within the time interval;
    determining that the number of use-input emotes for a first emote type exceeds a threshold;
    responsive to determining that the number of use-input emotes for the first emote type exceeds the threshold, augmenting user-input emotes corresponding to the first emote type with audio; and
    outputting the augmented user-input emotes corresponding to the first emote type for display to the plurality of audience devices.

9. The system of claim 8, wherein augmenting user-input emotes corresponding to the first emote type with audio comprises outputting audio along with the user-input emotes corresponding to the first emote type.

10. The system of claim 8, wherein the first emote type is an applause emote type and user-input augmenting emotes corresponding to the first emote type comprises outputting an applause sound along with the e user-input emotes corresponding to the first emote type.

11. The system of claim 8, wherein the first emote type is a laughing emote type and augmenting user-input emotes corresponding to the first emote type comprises outputting a laughing recording.

12. The system of claim 8, wherein an intensity or volume of the audio is varied based on an amount or rate at which the user-input emotes corresponding to the first emote type are detected.

13. The system of claim 8, wherein augmenting user-input emotes corresponding to the first emote type with audio comprises mapping the first emote type to a recording in a table of audio sounds to determine audio for augmenting the user-input emotes corresponding to the first emote type.

14. The system of claim 8, the operations further comprising:
    generating haptic feedback for output to a device of a presenter of the electronic presentation based on detecting a threshold number of user-input emotes.

15. A non-transitory computer readable storage medium comprising stored instructions, wherein the stored instructions when executed cause at least one processor to perform operations comprising:
    detecting user-input emotes of a plurality of emote types from a plurality of audience devices participating in an electronic presentation within a time interval, each emote to be output for display to other audience devices;
    determining a number of user-input emotes of each emote type detected from the plurality of audience devices within the time interval;
    determining that the number of user-input emotes for a first emote type exceeds a threshold;
    responsive to determining that the number of user-input emotes for the first emote type exceeds the threshold, augmenting user-input emotes corresponding to the first emote type with audio; and
    outputting the augmented user-input emotes corresponding to the first emote type for display to the plurality of audience devices.

16. The non-transitory computer readable storage medium of claim 15, wherein augmenting user-input emotes corresponding to the first emote type with audio comprises outputting audio along with the user-input emotes corresponding to the first emote type.

17. The non-transitory computer readable storage medium of claim 15, wherein the first emote type is an applause emote type and augmenting user-input emotes corresponding to the first emote type comprises outputting an applause sound along with the user-input emotes corresponding to the first emote type or the first emote type is a laughing emote type and augmenting user-input emotes corresponding to the first emote type comprises outputting a laughing recording.

18. The non-transitory computer readable storage medium of claim 15, wherein an intensity or volume of the audio is varied based on an amount or rate at which the user-input emotes corresponding to the first emote type are detected.

19. The non-transitory computer readable storage medium of claim 15, wherein augmenting user-input emotes corresponding to the first emote type with audio comprises mapping the first emote type to a recording in a table of audio sounds to determine audio for augmenting the user-input emotes corresponding to the first emote type.

20. The non-transitory computer readable storage medium of claim 15, the operations further comprising:
    generating haptic feedback for output to a device of a presenter of the electronic presentation based on detecting a threshold number of user-input emotes.

\* \* \* \* \*